US011736879B2

(12) United States Patent
Lyren et al.

(10) Patent No.: US 11,736,879 B2
(45) Date of Patent: Aug. 22, 2023

(54) PLAYING BINAURAL SOUND IN RESPONSE TO A PERSON BEING AT A LOCATION

(71) Applicants: Philip Scott Lyren, Bangkok (TH); Glen A. Norris, Tokyo (JP)

(72) Inventors: Philip Scott Lyren, Bangkok (TH); Glen A. Norris, Tokyo (JP)

( * ) Notice: Subject to any disclaimer, the term of this patent is extended or adjusted under 35 U.S.C. 154(b) by 19 days.

(21) Appl. No.: 17/520,584

(22) Filed: Nov. 5, 2021

(65) Prior Publication Data

US 2022/0060839 A1 Feb. 24, 2022

Related U.S. Application Data

(63) Continuation of application No. 17/062,633, filed on Oct. 5, 2020, now Pat. No. 11,172,316, which is a continuation of application No. 16/938,936, filed on Jul. 25, 2020, now Pat. No. 10,798,509, which is a continuation of application No. 16/558,078, filed on Aug. 31, 2019, now Pat. No. 10,728,682, which is a continuation of application No. 16/445,268, filed on Jun. 19, 2019, now Pat. No. 10,602,291, which is a continuation of application No. 16/162,416, filed on Oct. 17, 2018, now Pat. No. 10,440,489, which is a continuation of application No. 15/944,796, filed on Apr. 4, 2018, now Pat. No. 10,117,038, which is a continuation of application No. 15/424,901, filed on Feb. 6, 2017, now Pat. No. 9,980,072, which is a continuation of application No. 15/049,071, filed on Feb. 20, 2016, now Pat. No. 9,591,427.

(51) Int. Cl.

| | |
|---|---|
| ***H04S 1/00*** | (2006.01) |
| ***H04S 7/00*** | (2006.01) |
| ***H04R 29/00*** | (2006.01) |
| ***G06F 3/01*** | (2006.01) |
| ***G06F 3/16*** | (2006.01) |
| ***G06V 40/16*** | (2022.01) |

(52) U.S. Cl.

CPC .............. *H04S 1/005* (2013.01); *G06F 3/011* (2013.01); *G06F 3/012* (2013.01); *G06F 3/013* (2013.01); *G06F 3/167* (2013.01); *G06V 40/161* (2022.01); *G06V 40/168* (2022.01); *H04R 29/00* (2013.01); *H04S 7/301* (2013.01); *H04S 7/304* (2013.01); *G06V 40/172* (2022.01); *H04R 2499/11* (2013.01); *H04S 2420/01* (2013.01)

(58) Field of Classification Search

CPC .......... H04S 1/005; H04S 7/301; H04S 7/304; H04S 2420/01; G06F 3/011; G06F 3/012; G06F 3/013; G06F 3/167; G06V 40/161; G06V 40/168; G06V 40/172; H04R 29/00; H04R 2499/11

See application file for complete search history.

(56) References Cited

U.S. PATENT DOCUMENTS

2008/0008342 A1* 1/2008 Sauk ....................... H04S 1/002 381/315
2015/0092965 A1* 4/2015 Umminger .............. H04S 7/304 381/310
2015/0373477 A1* 12/2015 Norris ................... H04M 1/605 381/303

* cited by examiner

*Primary Examiner* — Yogeshkumar Patel

(57) ABSTRACT

An electronic device includes a display and one or more processors. The display displays, when a person is at a location, a virtual image at a sound localization point (SLP) in empty space. The one or more processors process sound with a room impulse response (RIR) for the location in order to generate binaural sound that externally localizes at the SLP in empty space in response to the person being at the location.

20 Claims, 14 Drawing Sheets

PLAYING BINAURAL SOUND IN RESPONSE TO A PERSON BEING AT A LOCATION

BACKGROUND

People are able to localize binaural sound by sensing audio cues in the form of temporal and spectral differences heard between the left and right ears. These differences can be artificially created using Head Related Transfer Functions (HRTFs). HRTF's are individualized or unique functions for each person since they depend on a size and a shape of a person's head, face, ears, torso, and other physiological factors.

Unfortunately, it is difficult or burdensome to obtain the HRTFs for an individual. Typically, the HRTFs of a person must be measured in an anechoic chamber or a specialized location that includes numerous speakers, expensive sound equipment, and a soundproof environment.

Methods and apparatus that facilitate obtaining HRTFs and audio impulse responses will advance technology that creates and maintains virtual environments, virtual reality, and augmented reality.

SUMMARY OF THE INVENTION

Figure 1:
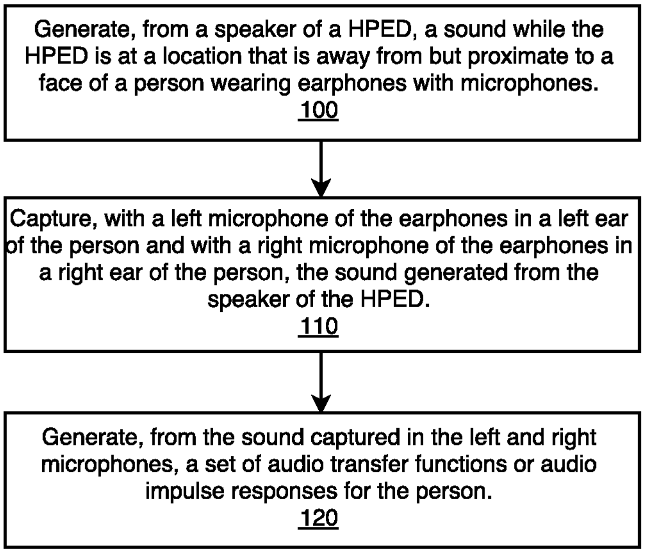
FIG. 1 is a method to generate audio impulse responses from a sound generated or triggered with a hand-held portable electronic device (HPED) in accordance with an example embodiment.

One example embodiment is a method that captures audio impulse responses using electronic microphones in a left ear and a right ear of a person. A handheld portable electronic device (HPED) generates or triggers a sound away from but proximate to the person. The microphones capture the audio impulse responses that are used to convolve sound that localizes away from but proximate to the person.

Other example embodiments are discussed herein.

DETAILED DESCRIPTION

Example embodiments relate to methods and apparatus that generate, manage, and perform tasks for audio impulse responses, including room impulse responses (RIRs), binaural room impulse responses (BRIRs), head-related impulse responses (HRIRs), and head-related transfer functions (HRTFs).

As noted in the Background section, it is difficult or burdensome to obtain HRTFs of a person. Deriving a person's HRTFs with traditional methods can be time consuming and expensive. Further, facilities to perform such measurements are not abundant and generally not accessible to the general public.

In some instances, HRTFs for a person are not derived from data taken directly from the person but are derived from one or more approximation techniques, such as obtaining HRTFs from a dummy head or approximating HRTFs from HRTFs individualized for another person. These approximated HRTFs are not as accurate as HRTFs measured directly from the person.

If the HRTFs are not sufficiently accurate for the person, then the person may localize sounds to the wrong location, such as localizing a sound toward the back of the head when the localization point is toward the front of the head. Additionally, if the HRTFs are not accurate, then the listener can fail to localize sounds externally and instead hear the sounds as if they originate inside the head of the listener.

Example embodiments include systems, apparatus, and methods that capture head related transfer functions (HRTFs) of a person and solve problems associated with binaural sound, including problems related to obtaining accurate HRTFs for a person. With example embodiments, the HRTFs are individualized or unique for the person and can be used to accurately localize binaural sound.

By way of introduction, sound localization (i.e., the act of relating attributes of the sound being heard by the listener to the location of an auditory event) provides the listener with a three-dimensional (3D) soundscape or 3D sound environment where sounds can be externally localized to points around the listener, such as external positions to which the listener can point. Binaural sound and some forms of stereo sound provide a listener with the ability to localize sound; though binaural sound generally provides a listener with a superior ability to localize sounds in 3D space.

Sound localization offers people a wealth of new technological avenues to not only communicate with each other but also to communicate with electronic devices, software programs, and processes. This technology has broad applicability in augmented reality (AR), virtual reality (VR), audio augmented reality (AAR), telecommunications and communications, entertainment, tools and services for security, medicine, disabled persons, recording industries, education, natural language interfaces, and many other sectors.

As this technology develops, challenges will arise with regard to how sound localization integrates into the modern era. Example embodiments offer solutions to some of these challenges and assist in providing technological advancements in methods and apparatus using sound localization.

Binaural sound can be manufactured or recorded. When binaural sound is recorded, two microphones are placed in or near human ears or placed in ears of a dummy head. When this binaural recording is played back (e.g., through headphones or earphones), audio cues in the recorded sound provide the listener with an audio representation of the 3D space where the recording was made. The sound is quite realistic, and the listener can localize sources of individual sounds with a high degree of accuracy.

Binaural sound typically delivers two types of localization cues: temporal cues and spectral cues. Temporal cues arise from an interaural time difference (ITD) due to the distance between the ears. Spectral cues arise from an interaural level difference (ILD) or interaural intensity difference (IID) due to shadowing of sound around the head. Spatial cues are ITDs and ILDs and their combination.

A person hearing the spatial cues can localize sound or estimate a location of a source of the sound. In some instances, a listener can externalize and localize a source of binaural sound to a point and experience the sound as indistinguishable from a real-world sound source occurring in his physical environment. Processing sounds through a listener's individualized HRTFs provides a markedly higher degree of realism than using approximated or stock HRTFs.

Although stereo sound offers some degree of sound localization, stereo sound and binaural sound are different. As explained in WIKIPEDIA, the term "binaural sound" and "stereo sound" are frequently confused as synonyms. Conventional stereo recordings do not factor in natural ear spacing or "head shadow" of the head and ears since these things happen naturally as a person listens and experiences his or her own ITDs (interaural time differences) and ILDs (interaural level differences). Headphones or earphones generally deliver binaural sound; although it can be delivered with loudspeakers. Loudspeaker-crosstalk of conventional stereo interferes with binaural reproduction, playback systems implement crosstalk cancellation to create a sweet spot for binaural listening. As a general rule, binaural sound accommodates for one or more ITDs, ILDs, natural ear spacing, and head shadow. The effects of these on a source signal can be derived from an individual's HRTF. Binaural sound can also be explained as causing or intending to cause one or more sound sources produced through headphones or earphones as originating apart from but proximate to the listener.

Binaural sound spatialization can be reproduced to a listener using headphones or speakers, such as with dipole stereo (e.g., multiple speakers that execute crosstalk cancellation). Generally, binaural playback on earphones or a specially designed stereo system provides the listener with a sound that spatially exceeds normally recorded stereo sound since the binaural sound more accurately reproduces the natural sound a user hears when at the location where the sound was recorded. Binaural recordings can convincingly reproduce the location of sound behind, ahead, above, or any position the sound actually came from during recording.

Sound signals are modified as they travel from their original source and interact with the human anatomy and surrounding environment. These modifications encode the location of the original source and can be captured as an impulse response. The impulse response for a human is called a head-related impulse response (HRIR), and it represents impulse responses from a sound source to two ears in a free-field environment (without modification due to a room environment). A HRTF is a Fourier transform of a HRIR.

A source sound can be convolved with a HRIR of a person. Convolving sound in this manner joins the original sound with impulses responses so the person hears the sound as if he or she were present at the source location when the sound was played. The HRIRs describe how to alter the sound source before the sound is provided to the ears of the listener.

Impulse responses for a room or a particular location are room impulse responses or RIRs, whereas impulse responses for a room as experienced by a particular person in the room with two ears are binaural room impulse responses or BRIRs. For example, BRIRs characterize the transfer of sound from a source location in a room to the entrances of the left and right ears of a listener (such as a person or a dummy-head). BRIRs can be obtained by measuring RIRs and HRIRs separately or simultaneously. Further, BRIRs, HRIRs, and RIRs can be obtained without measuring, such as being generated from computer modeling of impulse responses. As one example, RIRs and HRIRs are measured with microphones at one or more locations. As another example, RIRs and HRIRs are generated with one or more computer models. As yet another example, HRIRs are measured with microphones; RIRs are generated with a computer model; and HRIRs and RIRs are combined to generate BRIRs. As yet another example, individualized or customized HRIRs and/or HRTFs are generated from measurements and/or calculations based on an anthropometry-based method or subjective-selection-based method (such as customizing HRTFs for a person based on anatomical feature similarities of an individual with known, measured HRTFs of another individual). Transfer functions and impulse responses can also be generated from one or more interpolation techniques (such as interpolating a HRTF at a location between two known HRTFs or using a nearest known or measured location). Furthermore, impulse responses can be extracted to generate transfer functions, such as removing RIRs from a set of BRIRs to yield HRIRs/HRTFs or removing impulse responses due to a person's outstretched arm while holding the HPED to generate the sound.

FIG. 1 is a method to generate audio impulse responses from a sound generated or triggered with a hand-held portable electronic device (HPED).

Block 100 states generate, from a speaker of a HPED, a sound while the HPED is at a location that is away from but proximate to a face of a person wearing earphones with microphones.

Each ear of the person includes a microphone (i.e., the left ear has a microphone, and the right ear has a microphone). The earphones can include one or more of microphones, speakers, volume control, an on/off switch or power button, wireless communication circuitry, noise cancellation circuitry, etc. For example, the earphones include a left earphone with a left microphone and a left speaker and also include a right earphone with a right microphone and a right speaker.

The earphones can directly connect to the HPED or wirelessly communicate with the HPED and/or a wireless network. For example, the earphones transmit and receive data over the Internet through a wireless network.

Further, example embodiments are not limited to earphones but include other electronic devices with microphones that can be positioned in or near an ear of a person or dummy or otherwise record impulse responses. Examples of such devices with microphones include, but are not limited to, headphones, wearable electronic glasses, optical head mounted displays (OHMDs), heads-up displays, and other electronic devices with microphones that can record impulse responses or sound.

The speaker of the HPED plays or generates a sound that is used to determine audio impulse responses of the person and/or the room or environment where the person is located. By way of example, these impulse responses include one or more of HRIRs, BRIRs, and room impulse responses (RIRs).

Further, example embodiments are not limited to a HPED that generates the sound but include other devices that can generate a sound to record audio impulse responses for a person. For example, the HPED communicates with and/or triggers another device to play sound. Examples of devices that can generate a sound include, but are not limited to, wearable electronic devices, televisions, desktop computers, speakers, and other electronic devices that generate sound. Further, such sound generating devices can be non-electronic devices such as clickers, and include people (such as a person generating a sound by clapping, snapping fingers, knocking, or talking).

In an example embodiment, the sound generates left and right audio impulse responses that can be used to generate individualized or user-specific sets of HRTFs, HRIRs, or BRIRs. Different types of sounds can be used to generate these audio impulse responses. By way of example, such sounds include, but are not limited to, a known spectrum stimulus sound, a frequency-swept sine wave, a click, a pulse, a maximum length sequence (MLS), a pseudo-random binary sequence, a ping, a complementary Golay code, a voice announcing a word or a phrase, or another type of sound.

The HPED generates or triggers the sound while the HPED is away from but proximate to the face of the person wearing earphones with microphones (or other electronic device as noted herein). A distance from the face of the person to the HPED can range from a few inches to several meters. Preferably, this distance is sufficient so audio impulse responses can be generated from the sound and used to subsequently convolve sound so it externally localizes to the listener. For example, the HPED is positioned away from the person at a distance and angle such that the sound it generates provides microphones in a person's ears with sufficient impulse responses to generate a set of HRTFs, HRIRs, or BRIRs for the person. When this set is used to convolve a voice signal, the person localizes the voice to a point proximate but away from him, such as localizing sound to a SLP in empty space or localizing sound to a SLP on an object.

A HRTF is a function of frequency (f) and three spatial variables (r, θ, ϕ)) in a spherical coordinate system. Here, r is the radial distance from an origin of the sound to the recording point; θ (theta) is the azimuth angle between the origin and recording point; and ϕ(phi) is the polar angle, elevation, or elevation angle between the origin and recording point.

When the distance (r) is greater than or equal to about one meter (1 m) as measured from the sound source to the capture point (e.g., the head of the person), the sound attenuates inversely with the distance. One meter or thereabout defines a boundary between near field and far field HRTFs. A "near field" HRTF is measured from about one meter or less; whereas a "far field" HRTF is measured from about one meter or more. Example embodiments can be implemented with near field and far field distances.

Block 110 states capture, with a left microphone of the earphones in a left ear of the person and with a right microphone of the earphones in a right ear of the person, the sound generated from the speaker of the HPED.

The left microphone captures the sound at the left ear, and the right microphone captures the sound at the right ear. Further, as noted, the earphones can be electrically connected to and/or in communication with an electronic device, such as being physically coupled or connected to a sound jack on the HPED or being in wireless communication with the HPED, a network, a server, or another electronic device.

Block 120 states generate, from the sound captured in the left and right microphones, a set of audio impulse responses or audio transfer functions for the person.

When the microphones are positioned in the ears of the listening person, the HPED generates the sound while being at a distance (r) from the head of the person, at an azimuth angle (θ), and at an elevation angle (ϕ) (i.e., being at (r, θ, ϕ)). The captured sound is processed to generate one or more sets of HRTFs, HRIRs, RIRs, and BRIRs for the person and/or the location.

During the processing, aspects of the measured impulse responses can be removed. For example, impulse responses attributed to the earphones (known as common transfer functions or CTFs) to yield a head related transfer function (HRTF) or directional transfer function (DTF) for the location from where the sound was generated. CTFs are also known as headphone or earphone transfer functions and can also be measured and appropriately inverted.

Consider an example for calculating a HRTF or DTF for a known audio signal s(t) that generates from a speaker of a HPED at a position (distance, azimuth, elevation) or (r, θ, ϕ). The calculations below are for the left (l) ear, but are equally applicable to the right ear:

$$m_l,\theta,\phi(t)=s(t)\cdot c(t)\cdot c(t)\cdot d_l\theta,\phi(t);$$

$$M_l,\theta,\phi(\omega)=S(\omega)C(\omega)D_l,\theta,\phi(\omega).$$

Here, $m_l,\theta,\ \phi(t)$ is the signal recorded with the microphone of the left ear given the original known sound, s(t); c(t) is the known common transfer function or CTF; and $d_l,\theta,\phi(t)$ is the unknown directional transfer function for the left ear. As such, the signal recorded at the left ear is a function of the known original signal, the CTF, and the unknown directional transfer function at the (r, θ, ϕ), with the distance (r) being one meter or greater or measured for a far field HRTF.

The above equations are rewritten to solve for $d_l,\theta,\phi(t)$ as follows:

$$|D_l,\theta,\phi(\omega)|=|M_l,\theta,\phi(\omega)|/((|S(\omega)(|C(\omega|));$$

$$\angle D_l,\theta,\phi(\omega)=\angle M_l,\theta,\phi(\omega)-\angle S(\omega)\angle C(\omega);$$

$$D_l,\theta,\phi(\omega)=|D_l,\theta,\phi(\omega)|\exp(j\angle D_l,\theta,\phi(\omega));$$

$$d_l,\theta,\phi(t)=F^{-1}(D_l,\theta,\phi(\omega)).$$

The corresponding directional transfer function for the right ear would thus be:

$$d_r,\theta,\phi(t)=F^{-1}(D_r,\theta,\phi(\omega)).$$

Following the derivation, the HRTFs can be stored in the AES69 spatial acoustic data file format.

Figure 2:
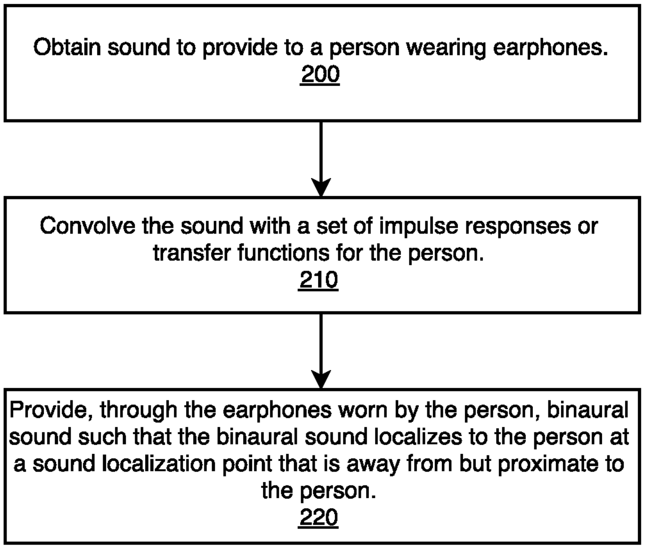
FIG. 2 is a method to provide binaural sound to a person at a SLP that is away from but proximate to the person in accordance with an example embodiment.

FIG. 2 is a method to provide binaural sound to a person at a SLP that is away from but proximate to the person.

Block 200 states obtain sound to provide to a person wearing earphones.

One or more electronic devices capture or provide the sound. The sound can be delivered over a wired or wireless network, from a server, or from a computer or local electronic device. Some example sources of the sound include, but are not limited to, sound streamed and provided in real-time from a telephony application or a live video call, sound provided by a computer program such as a multiplayer game with voices of other people, characters, and sound effects, sound output by a computer program with a voice interface, sounds played from a sound or music library or database, or sound from all of these sources or other sources.

The person can wear various types of electronic devices that provide binaural sound. Examples of such electronic devices include, but are not limited to, earphones, headphones, electronic glasses, a head mounted display, a heads-up display, or another wearable electronic device (such as a device with two or more speakers). Furthermore, binaural sound can be provided to a person that does not wear earphones, such as providing binaural sound through two or more speakers.

Block 210 states convolve the sound with a set of impulse responses or transfer functions for the person.

Sound can be convolved either directly in the time domain with a finite impulse response (FIR) filter or with a Fast Fourier Transform (FFT). For example, an electronic device convolves the sound with a set of HRTFs, HRIRs, BRIRs, or RIRs and provides the person with binaural sound.

In an example embodiment, convolution involves an audio input signal and an impulse response. The input signal can be a limited length audio signal (such as a pre-recorded digital audio file) or an ongoing audio signal (such as sound from a microphone or streaming audio over the Internet from a continuous source). The impulse response can be a set of HRIRs, BRIRs, RIRs, etc.

Convolution applies one or more FIR filters to the input signals and convolves them into binaural audio output or binaural stereo tracks, such as convolving the input signal into binaural audio output that is specific or individualized for the listener based on one or more of the listener's impulse responses.

The FIR filters are derived binaural impulse responses that are obtained from example embodiments discussed herein (e.g., derived from signals received through microphones placed in, at, or near the left and right ear channel entrance of the person). Alternatively or additionally, the FIR filters are obtained from another source, such as generated from a computer simulation or estimation, generated from a dummy head, retrieved from storage, etc. Further, convolution of an input signal into binaural output can include sound with one or more of reverberation, single echoes, frequency coloring, and spatial impression.

Processing of the sound can also include calculating and/or adjusting an interaural time difference (ITD), an interaural level difference (ILD), and other aspects of the sound in order to alter the cues and artificially alter the point of localization. Consider an example in which the ITD is calculated for a location (θ, ϕ) with the time-domain DTFs calculated for the left and right ears per the equations above. The ITD is located at the point for which the function attains its maximum value, known as the argument of the maximum or arg max as follows:

$$ITD = \operatorname{argmax}(\tau)\sum_n d_{l,\theta,\phi}(n)\cdot d_{r,\theta,\phi}(n+\tau).$$

Subsequent sounds are filtered with the left HRTF, right HRTF, and ITD so that the sound localizes at (r, θ, ϕ). Such sounds include filtering stereo and monaural sound to localize at (r, θ, ϕ). For example, given an input signal as a monaural sound signal s(n), this sound is convolved to appear at (θ, ϕ) when the left ear is presented with:

$$s_l(n)=s(n-\text{ITD})\cdot d_l,\theta,\phi(n);$$

and the right ear is presented with:

$$s_r(n)=s(n)\cdot d_r,\theta,\phi(n).$$

Block 220 states provide, through the earphones worn by the person, binaural sound such that the binaural sound localizes to the person at a sound localization point that is away from but proximate to the person.

After the input signal is convolved, it can be provided to the person (listener), stored, transmitted, further processed, etc. Although some example embodiments teach that the sound is provided through earphones, binaural sound can also be provided to a person through two or more loudspeakers, such as through stereo speakers positioned in a room with listener or through car speakers.

Consider an example in which a dedicated digital signal processor (DSP) executes frequency domain processing to generate real-time convolution of monophonic sound to binaural sound.

By way of example, a continuous audio input signal x(t) is convolved with a linear filter of an impulse response h(t) to generate an output signal y(t) as follows:

$$y(\tau) = x(\tau)\cdot h(\tau) = \int_0^\infty x(\tau - t)\cdot h(t)\cdot dt.$$

This reduces to a summation when the impulse response has a given length N and the input signal and the impulse response are sampled at t=iDt as follows:

$$y(i) = \sum_{j=0}^{N-1} x(i-j)\cdot h(j).$$

Execution time of convolution further reduces with a Fast Fourier Transform (FFT) algorithm and/or Inverse Fast Fourier Transform (IFFT) algorithm.

Consider another example of binaural synthesis in which recorded or synthesized sound is filtered with a binaural impulse response (e.g., HRIR or BRIR) to generate a binaural output sound to the person. The input sound is preprocessed to generate left and right audio streams that are mapped to one or more virtual sound sources or sound localization points (known as SLPs). These streams are convolved with a binaural impulse response for the left ear and the right ear to generate the left and right binaural output sound signal. The output sound signal can be further processed depending on its final destination, such as applying a cross-talk cancellation algorithm to the output sound signal when it will be provided through loudspeakers or applying artificial binaural reverberation to provide 3D spatial context to the sound.

One problem is that a distance from the source of the sound (e.g., the speaker in a HPED) and the recording location, (e.g., the head of the person wearing microphones in both ears) can impact the quality of impulse responses captured and subsequently used to convolve sound for the listener. For example, if this distance is too close (e.g., under one meter), then near-field HRTFs will be captured. When the distance is greater than about one meter, then far-field HRTFs will be captured. If this far-field distance is too far, however, the arriving sound signal may be too weak to effectively capture impulse responses at the head of the listener. Additionally, the sound arriving at the microphones may be overly affected with sound reverberations from the room or location where the recordings occur. Further, a person attempting to capture impulse responses to generate binaural sound may be unable to designate or measure optimal locations or distances for placing the HPED with respect to the head of the person.

Figure 3:
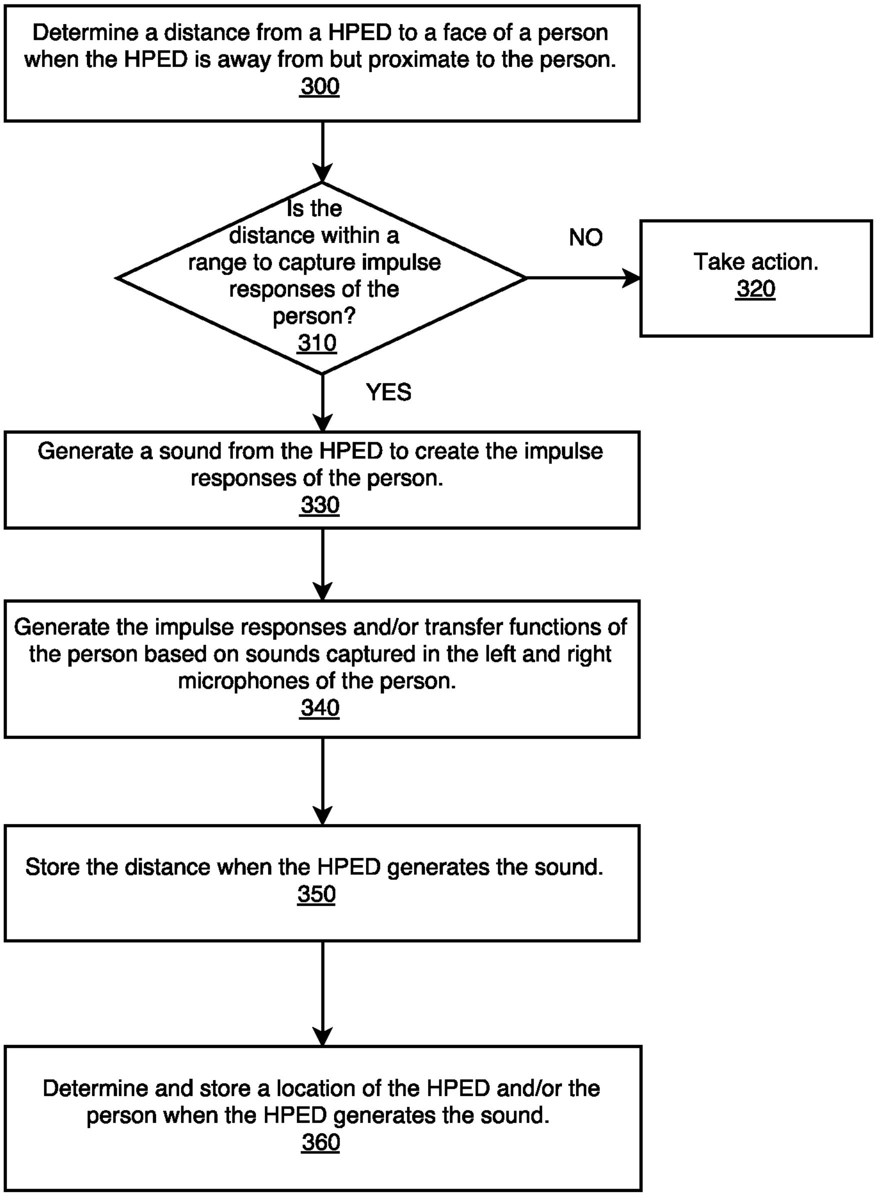
FIG. 3 is a method to capture impulse responses when an HPED is within a certain distance of a person in accordance with an example embodiment.

Example embodiments, including FIG. 3 and other figures, address these problems and others.

FIG. 3 is a method to capture impulse responses when an HPED is within a certain distance of a person.

Block 300 states determine a distance from a HPED to a face of a person when the HPED is away from but proximate to the person.

A determination is made of the distance between the HPED and the face of the person in order to know the distance when the HPED generates the sound to capture the impulse responses. By way of example, the HPED or another electronic device can determine this distance with various apparatus and methods that include, but are not limited to, a camera (such as measuring distance based on one or more pictures or video), a light emitter and sensor (such as a laser or infrared emitter and detector), ultrasonic range finder, and a proximity sensor. Alternatively, the distance can be measured (such as measured with a tape measure). As another example, the distance can be measured or approximated with a device, such as attaching the HPED to a pole, monopod, tripod, rod, or selfie-stick that has a known length and/or height.

Block 310 makes a determination as to whether the distance is within a range to capture impulse responses of the person.

The range depends on various factors, such as a quality of sound generated from or triggered by the HPED, the quality and type of microphones used, an amount of ambient noise present, an amount of reverberation or attenuation, a type of room, a type of communication for which the impulse responses will be used, and the type of impulse responses that a user or electronic device desires to capture.

For near-field impulse responses, the range is from 0.0 meters to about 1.0 meter. For far-field impulse responses, the range is from about 1.0 meter to about 2.5 meters. These values are exemplary since the ranges can be further divided. For example, the far-field range can be shortened or lengthened depending on a type of sound being captured, reverberation at the location, an amount of reverberation desired, a type of communication for which the impulse response will be used, and other factors.

As noted, one factor is the type of communication for which the impulse response will be used. For example, if an impulse response is being captured for voice telephony, the user may desire to have such impulse responses captured within a specific or predetermined range, such as 1.0-1.5 meters. As another example, if the impulse response is being captured for an advertisement, then the listener may not want the advertisement to localize close to the head of the listener. As such, the range for advertisements can be farther, such as 1.5-2.0 meters. As yet another example, a listener may want voices of an intelligent user agent (IUA) or an intelligent personal assistant (IPA) to localize relatively closer to his or her head. As such, the range for these voices can be relatively closer, such as 0.5-1.1 meters.

If the answer to this determination is "no" then flow proceeds to block 320 that states take action.

An action occurs when the distance is not within a specified or predetermined range. For example, the distance is not in an optimal range to generate useful impulse responses.

Example actions include, but are not limited to, providing the user or other person with an audible warning (e.g., playing a sound warning from the HPED), providing the user or other person with a visual warning (e.g., displaying a visual indication on the HPED or other display, such as a text or light or an image), preventing the HPED from generating the sound to capture the impulse response (e.g., the HPED will not automatically generate the sound), allowing the HPED to generate the sound (e.g., the HPED generates the sound but notes a warning or designation with the distance), instructing the user or other person to change the distance (e.g., providing a written message or announcement from a voice to move closer or farther away in order to be within the range), capturing multiple impulse responses from the same location or other locations proximate to the location (e.g., capturing more impulse responses when the listener is not within a range), processing the impulse responses to compensate for the distance, or taking another action.

If the answer to the determination in block 310 is "yes" then flow proceeds to block 330 that states generate a sound from the HPED to create the impulse responses of the person.

The HPED generates a sound so the microphones can capture an impulse response that is used to convolve sound for the listener. The HPED can also trigger or cause another device to generate a sound. For example, the HPED communicates with another HPED or speakers proximate to the person with the microphones, and this communication causes the other speakers to generate a sound to capture an impulse response. For example, the HPED instructs a stereo system to generate the sound through stereo speakers in a home theater system, or through a Bluetooth speaker mounted on a hand-held pole or another location around the listener such as a table.

Block 340 states generate the impulse responses and/or transfer functions of the person based on the sounds captured in the left and right microphones of the person.

The microphones capture the sounds at the left and right ears, and these sounds generate the set of HRTFs, HRIRs, RIRs, and/or BRIRs for the location of the HPED relative to the person. Subsequent sounds that are convolved with this set of impulse responses or transfer functions will localize to the listener at the position of the HPED when the HPED generated the sound for the impulse responses.

The sounds captured at the microphones can be further processed to generate specific impulse responses or transfer functions. For example, the sounds are processed to remove CTFs, such as those associated with the earphones or those associated with an arm of a person (e.g., in a situation in which a person holds the HPED away from his or her face and generates the sound). The sounds can also be processed to remove impulse responses associated with the room in which the listener and HPED are located (such as removing RIRs from the impulse responses to generate HRIRs).

Block 350 states store the distance when the HPED generates the sound.

The distance between the HPED (or sound generating device) and the listening person wearing the microphones is recorded, stored, transmitted, processed, etc. For example, each set of impulse responses (i.e., one for the left ear and one for the right ear) has an associated distance from the listening person.

Block 360 states determine and store a location of the HPED and/or the person when the HPED generates the sound.

A record is created or updated that contains the SLP that localizes sound for the listener at the point where the sound was emitted. The record also contains the associated impulse responses and transfer functions, an identifier of the user whose head responses were measured, details of the capture process and context, and other information, such as other information discussed herein.

A HPED or other electronic device can determine its location with various apparatus and methods that include, but are not limited to, Global Positioning System or GPS (including assisted and synthetic GPS), cellular identification, WiFi (including received signal strength indication and wireless fingerprinting), internal sensors (including a compass, a magnetometer, an accelerometer, a gyroscope, or other inertial sensors), an ultrasonic or short-range wireless systems (including radio-frequency identification or RFID, near-field communication or NFC, broadcasting and reception of ultrasonic tones, Bluetooth beacons, and local transmitters (including transmitters mounted on buildings)), a camera (including a camera in a HPED), and combinations of these methods and apparatus.

The location and orientation of the HPED (or sound generating device) and the listening person wearing the microphones are recorded, stored, transmitted, processed, etc. For example, each set of impulse responses (i.e., one for the left ear and one for the right ear) has one or more associated locations (such as having a location for the listening person and/or a location for the HPED or sound generating electronic device).

The distance, the location, and the orientation are stored for each impulse response. For example, this information includes (r, θ, ϕ). This location can also include a GPS location or other location information that identifies where the HPED and/or listening person were when the impulse responses were generated and recorded.

If the impulse responses are not recorded in an anechoic chamber or special sound room or location, then each location is unique and will include room impulse responses (RIRs). As such, the sound recorded with the microphones can be processed to include BRIRs since the impulse responses include both HRIRs of the person and RIRs of the surrounding environment.

Locations are unique and so are the BRIRs captured for each person at each different location. An electronic device stores these locations and the associated impulse responses so desired impulse responses can be subsequently retrieved for use at the same location, for use in a similar location, or for use according to the wish of the user without regard to his location.

Consider an example in which a person desires to localize voice telephony to a location three feet from his head at either forty-five degrees to his right or forty-five degrees to his left. One SLP is (3.0 feet, +45°, 0°) and is stored as SLP1; and another SLP is (3.0 feet, −45°, 0°) and is stored as SLP2. The person captures BRIRs at three different environmental locations for these two SLPs. These environmental locations include BRIRs captured at his office (stored as “Office”), BRIRs captured at his house (stored as “House”), and BRIRs captured at the park (stored as “Park”). The person further designates individuals stored in his electronic contact list to both a SLP and an environmental location. For example, the person designates his co-worker Alice as Office SLP1, and designates his wife as House SLP2. When Alice calls, her voice localizes at (3.0 feet, +45°, 0°) with reverberations from the office. In other words, her voice sounds like she is at the office. When his wife calls, her voice localizes at (3.0 feet, −45°, 0°) with reverberations from their home. In other words, her voice sounds like she is at the house.

Traditionally, impulse responses were captured in a strictly controlled environment in which microphones were placed in ears of a real person or a dummy-head while the person or dummy-head was placed in an anechoic chamber and surrounded by many speakers. The distances between the speakers and person were known, and the azimuth and elevation angles from the face of the person or recording point to the speakers were also known. In this manner, HRTFs could be captured for precise locations around the head of the person or dummy.

One problem is the general public, however, does not have convenient or easy access to an anechoic chamber or controlled sound environment with expensive sound equipment.

Figure 4:
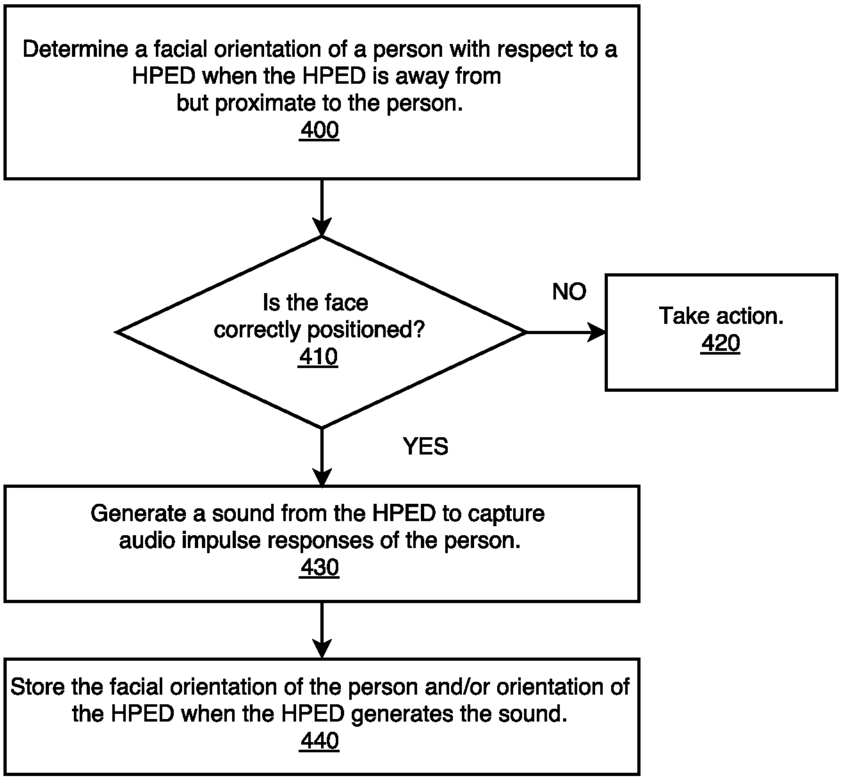
FIG. 4 is a method to determine a facial orientation of a listening person when an audio impulse response is recorded in accordance with an example embodiment.

Example embodiments, including FIG. 4 and other figures, solve this and other technical problems associated with generating, capturing, and determining individualized impulse responses for people. Example embodiments capture impulse responses without this type of controlled or expensive environment. Instead, people can capture their individualized HRTFs, HRIRs, and/or BRIRs without relying on the expensive and time-consuming traditional practice of capturing impulse responses in an anechoic chamber or other specialized sound location.

FIG. 4 is a method to determine a facial orientation of a listening person when an audio impulse response is recorded.

When an impulse response is captured and recorded at microphones located in the ears of the listening person, a facial orientation or head orientation of the person is determined and recorded. This facial or head orientation can include one or more of an azimuth angle of the face, an elevation angle of the face, a tilt of the face, a general location of the direction of gaze with respect to another object (such as a HPED), and a facial expression or emotion of the face. By way of example, a facial or head orientation can be measured and recorded with respect to yaw, pitch, and roll of the head of the person. As another example, facial orientation can be measured, described, and/or stored with respect to a HPED. For instance, the HPED is located on a right side or left side of a face of a person, and the facial orientation is determined with respect to this location of the HPED.

Block 400 states determine a facial orientation of a person with respect to a HPED when the HPED is away from but proximate to the person.

Two factors determine a gaze of a person: a head or facial orientation (i.e., face pose or face direction) and eye orientation (i.e., eye gaze direction). Typically, the facial orientation determines a global direction of the gaze, and the eye orientation determines a local direction of the gaze. When a head of the person is level and he or she looks straight ahead, then the line-of-sight of the eye gaze and the facial orientation are straight ahead with 0° azimuth and 0° elevation and 0° tilt. This head position can also be described as a neutral head orientation position or neutral facial orientation with an X-Y-Z coordinate system or yaw, pitch, and roll to be (0°, 0°, 0°).

Various methods and/or apparatus can measure, determine, or estimate a deviation or variance from this neutral facial orientation and/or obtain one or more measurements of the yaw, pitch, and roll of the head or azimuth and elevation angles. One example embodiment uses facial recognition to determine or estimate a facial or head orientation of the person from one or more images or video captured with a camera in the HPED. The facial orientation can be described or recorded with respect to a location of the HPED that is generating the sound for the impulse responses.

One way to determine facial orientation is with a video-based facial orientation determination. This includes head-based approaches, ocular-based approaches (or eye-based approaches), and combinations of these two approaches.

Another way to determine facial orientation is with a classification-based facial orientation determination. This determines a relationship between face pose and its appearance via a statistical learning algorithm. Facial orientation is determined from face samples and various factors, such as illumination, pose variation, expression, etc.

Another way to determine facial orientation is with a geometry-based facial orientation determination. This builds a three-dimensional (3D) model of the face to determine facial orientation. For instance, facial contour and facial components of the person are matched with their projection on a 2D image.

Facial orientation can be determined from the relative position of salient anatomical local facial features of the person (such as a relative position of the nose, eyes, lips, and ears of the person). For example, the face is partitioned into several regions by detecting pixels that correspond to one or more salient facial features, facial components, or facial regions. Facial orientation is estimated from the relative positions of the salient regions.

Consider an example in which the HPED includes or communicates with a real-time facial orientation determiner, such as a real-time face interpretation engine for smartphones. This determiner estimates facial orientation or head poses (e.g., pitch, roll, and yaw) from facial images captured with the camera in the smartphone and from one or more motion sensors in the smartphone. For instance, an accelerometer and gyroscope in the smartphone detect tilt and motion of the smartphone, and the camera captures images or video of the person. Readings from the accelerometer and gyroscope provide information with regard to the direction of gravity and an intensity of the motion of the smartphone. As such, the smartphone is not required to be held in a particular orientation to determine the facial orientation of the person at whom the camera is directed. By way of example, an AdaBoost object detection algorithm detects a location of the face on the display of the smartphone. A spatial relationship between feature points or edges or corners of these feature points on the face (or landmarks) provides an estimation of facial orientation of the person.

Consider an example in which a camera in a HPED (such as a smartphone) captures an image of the person, and facial recognition software determines 2D feature points on the image and reconstructs a 3D pose. An algorithm (such as Pose from Orthography and Scaling with Iterations or POSIT) estimates the facial orientation of the person.

Consider an example in which a facial interpretation engine that executes on a smartphone estimates or determines facial orientation of a person.

Facial orientation can be determined with or without the use of a camera or image of the person. For example, the sound generated from the HPED and provided to the microphones positioned in the ears of the person provides information as to the facial orientation of the person. When the HPED is positioned directly in front of the face of the person, the ITD between the left and the right ear is zero. The ITD between the two ears, however, changes in a predictable or known amount as the azimuth angle increases or decreases. A measurement of the ITD thus correlates to a facial orientation of the person.

Facial orientation can also be determined with a compass. For example, the HPED includes a compass that measures and records a direction of a forward-looking direction of the face. Thereafter, the azimuth angle is calculated from compass directions of the HPED as it points toward and moves around a head of the person. Consider an example in which the person looks north at a compass heading of 0°. The HPED is positioned 1.0 meter from the face of the person and the camera lens of the HPED points at the head to a direction of south or 180°. Here, the HPED is directly in front of the person at an azimuth of 0°. The HPED then moves along an arc (i.e., maintaining its distance of 1.0 meter) until its compass points to South West or 225° while continuing to point the lens to the head of the person. The azimuth angle with respect to the person is calculated by subtracting the current compass direction of 225° from 180° to yield 45°, which corresponds to the facial orientation of the person with respect to the current location of the HPED.

A person can also determine or assist in determining facial orientation. For example, an HPED instructs a person to position the HPED approximately three to four feet from the face of the person at an azimuth angle of about 20°-45°. When the person confirms the designated placement, the HPED generates the sound to capture the impulse responses in the microphones located in the ears of the person. This location where the sound was generated relative to the face of the person represents a SLP (i.e., a point or area where sound is localized). Thereafter, the HPED convolves sound so it localizes to this relative location for the person. The HPED can also use a timer or time delay feature to allow a person to return to his designated position prior to the sound being emitted.

Facial orientation and/or the location of the HPED can be based on a reference point, such as a point in a spherical coordinate system, a point in the X-Y-Z coordinate system, or another point. For example, a smartphone captures an image of a person while the smartphone is located one meter away from the face of the person and at a left side of the person. The smartphone determines the facial orientation to be looking to the right with respect to the location of the smartphone, and records its location as being away from the face and on its left side. An example embodiment can use a combination of two or more of these methods for a higher probability of accuracy.

Block 410 makes a determination as to whether the facial orientation is correct.

If the answer to this determination is "no" then flow proceeds to block 420 that states take an action.

An action occurs when the facial orientation is not correct or not preferred. For example, the person may be facing or looking in the wrong direction. As another example, the HPED or speaker of the HPED may be facing or pointing in a wrong direction. As yet another example, a SLP for the current facial orientation is already captured. As another example, the facial orientation may be correct, but the HPED is too close to the person, too far away from the person, or at an incorrect elevation angle with respect to the person.

Example actions include, but are not limited to, providing the user or other person with a sound warning (e.g., playing a sound warning from the HPED), providing the user or other person with a visual warning (e.g., displaying a visual indication on the HPED, such as a text or light or an image), preventing the HPED from generating the sound to capture the impulse response (e.g., the HPED will not automatically generate the sound), allowing the HPED to generate the sound (e.g., the HPED generates the sound but notes a warning or designation with the facial orientation), instructing the user or other person to change the facial orientation or the orientation of the HPED (e.g., providing a written message or announcement from a voice to move or rotate the HPED and/or change a head orientation of the person), capturing multiple impulse responses from the same location or other locations proximate to the location (e.g., capturing more impulse responses when the listener and/or HPED does not have a specified or correct orientation), processing the impulse responses to compensate for the facial orientation, or taking another action.

If the answer to this determination is "yes" then flow proceeds to block 430 that states generate a sound from the HPED to capture audio impulse responses of the person.

The HPED generates the sound, and the microphones at the ears of the listener capture the impulse responses at the listener.

Correct facial orientation can depend on one or more factors including, but not limited to, current settings of the HPED, preferences of the person, desired locations for SLPs, previous SLP or impulse responses captured, environmental conditions, accuracy of determining or estimating impulse responses, a location of the HPED with respect to the face of the person, a location of the person and/or HPED, a level or amount of background noise, an orientation or rotation of the HPED with respect to the head orientation of the person, what sound is selected to generate the impulse responses, a distance between the face of the person and the HPED, an intended use for the impulse responses (e.g., used to localize sound in gaming applications, telephony applications, intelligent user agent or intelligent personal assistant applications, etc.), physical attributes of the listening person (such as his or her age, size, hair, amount of face exposed, amount of ears exposed, etc.), and other factors.

Further, the facial orientation can be calculated and stored with specific coordinates or locations (such as a specific azimuth and/or elevation angle), and/or other coordinates (such as an (x, y, z) position and orientation (yaw, pitch, roll) in the room), and/or with general coordinates or locations (such as located at a right side of a face, located at a left side of a face, located above a head of the person, etc.).

Block 440 states store the facial orientation of the person and/or the orientation of the HPED when the HPED generates the sound.

In addition to storing an orientation of the face and/or HPED, other information can be determined and stored as well. By way of example, this other information includes, but is not limited to, a height of the HPED from ground, altitude above sea level, a height of a face of the person from ground, objects recognized between the person and the HPED, objects proximate to the person, a room scan and the positions of the HPED and listener within the room, a distance between the HPED and the face of the person, a time of day and calendar date, a location of the HPED and/or person when the impulse responses are captured, a decibel level of the sound generated from the HPED, a type of sound used or selected to generate the impulse responses, a number of impulse responses generated and captured, ambient sound or background at the location of the HPED and/or person when the impulse responses are captured, environmental conditions (such as temperature, humidity, etc.) when the impulse responses are generated and captured, and other data discussed herein.

Consider an example in which a smartphone executes an application that assists a user (Alice) in automatically obtaining impulse responses so she can enjoy localized voices for voice telephony. Alice desires to localize voices for calls in one of three locations or at one of three SLPs: SLP 1 defined as stereo sound (where voices appear to originate inside her head), SLP 2 defined as approximately three feet from a right side of her face at an azimuth angle of about 20° to 45° and an elevation angle of about 0°, and SLP 3 defined as approximately three feet from a left side of her face at an azimuth angle of about negative 20° to negative 45° and an elevation angle of about 0°. Bob (Alice's friend) holds her smartphone and views its display that shows him where to position the smartphone with respect to Alice's face. Bob moves about four feet from Alice and holds her smartphone out in front of himself so the speaker is pointed at her face. The smartphone determines it is located three feet and five inches from Alice's face, and this position is correct since it is within an acceptable range for localizing voice calls. The smartphone also determines that it is located at an azimuth angle of +28° and at an elevation angle of 3° from Alice's face. These angles are within an acceptable range to position an SLP for voice calls. Upon arriving at this position, the smartphone instructs by announcing: "Taking picture in three, two, one." One second later a speaker in the smartphone generates a distinct tone that is specific for generating audio impulse responses that can be used to convolve sound. Microphones in Alice's ears capture this tone, and the smartphone generates BRIRs for the current location and stores them as SLP 2. The smartphone instructs Bob to move to the left side of Alice so it can generate another tone and capture Alice's BRIRs for SLP 3. Thereafter, when Alice receives a voice call, her smartphone convolves the sound according to the measured impulse responses so the voice of the caller localizes to one of SLP 2 or SLP 3.

Alternatively Alice's smartphone can work in cooperation with Bob's smartphone to direct Bob to hold it at the designated position and generate the audio impulse from Bob's smartphone or from Bob himself.

In another example embodiment, the HPED does not produce the audio impulse itself at a designated instant but instead instructs the user to cause the audio impulse to be emitted. For example, the HPED enters a mode of readiness to capture the audio impulse and the HPED informs the user to cause the audio impulse within twenty seconds. The user can cause a sound that the HPED will recognize by prearrangement as the target impulse. The target impulse is the designated sound that the HPED will analyze in order to create the BRIRs and HRTFs. As an alternative example, the HPED informs the user that it is in the ready state for the next twenty seconds and directs the user to cause the audio impulse. The HPED then analyzes the impulses and selects the target impulse that is suitable to use in the creation of a set of BRIRs and/or HRTFs. As another example, the HPED can be set in a ready mode to capture target impulses that occur in a prearranged zone such as an approximate azimuth angle or with an approximate ITD. Further, the HPED can be designated in its ready mode to analyze the first impulse following a certain spoken trigger word or sound, or following a voice signal that exceeds a certain volume, such as double the average volume of the background noise. The examples above illustrate that an example embodiment can capture and record the sounds at a location for various lengths of time and then select the optimal impulse to use in creating the BRIRs and HRTFs. The HPED can also be instructed to disregard impulses according to a set of criteria, and/or to consider for analysis impulses that match a set of criteria and disregard ones that do not match the criteria.

In another example embodiment, the HPED can use the set(s) of criteria in order to select the target impulse, however the HPED is not commanded to enter a ready state. Instead, an application executing on the HPED continually or periodically captures, records, and erases sound from the environment. Memory retains a certain number of seconds of the recorded sound prior to any moment in a dynamic cache. The application continuously monitors the cache and analyzes the recorded sound to identify one or more keywords or key sounds. The keywords or key sounds can be the target impulse(s), or they can indicate that the target impulse is following or has preceded the keyword or key sound. Upon the identification of a target impulse, the application stores the impulse to memory and thereafter processes saved impulses into BRIRs and/or HRTFs and enters them in the SLP database. Consider an example in which the following sounds are designated as target impulses: the sound of a rubber band snapping against a book, the sound of the soles of two shoes clapped together, the sound of an isolated hand clap, the sound of a tongue click, the sound of a wine glass clink, the sound of a car key rap on a glass pane.

Consider an example in which Alice and two friends are seated in a restaurant. Alice wishes to create a designated SLP for each of them. Alice says, "I have a new binaural phone. Please clap yourselves in." Her phone is in the ready state to capture predefined target impulses, she is wearing her microphones at her ears, and keeps her head facing forward. Bob then claps his hands once and says, "I'm Bob." Yoko says, "This is Yoko," and claps. During this period the application identifies two separate target impulses and saves each one to memory for subsequent processing into SLPs. The SLPs are added to the database and associated with Bob and Yoko in her smartphone's contact list. Thereafter during phone calls with Bob and/or Yoko she can localize each to their relative position to her when they were at the restaurant.

When an impulse response is captured in accordance with an example embodiment, a SLP is calculated for the impulse response and its corresponding location, such as the (r, θ, ϕ) location where the HPED was when it generated the sound. Each SLP has unique characteristics since each SLP can be captured at a different location (r, θ, ϕ), captured with a different head orientation of the listener, captured with a different sound, captured with a different speaker generating the sound, captured under different environmental conditions, etc. If the user has one or two SLPs, then these SLPs and their characteristics can be readily remembered or managed. As the number of SLPs increases, however, it becomes more difficult for the user to manage the SLPs and determine information such as which SLP corresponds to which location, what SLPs the user has, what areas near the user do not have SLPs, what RIRs or HRIRs are associated with which SLPs, how accurate a particular SLP is, which SLPs a user prefers for use with particular headphones, which SLPs a user prefers for speaking with particular people, which SLPs a user prefers at particular times of day or under particular circumstances, where sound for each SLP actually localizes to the user, etc. Example embodiments assist in solving these and other technical problems.

Figure 5:
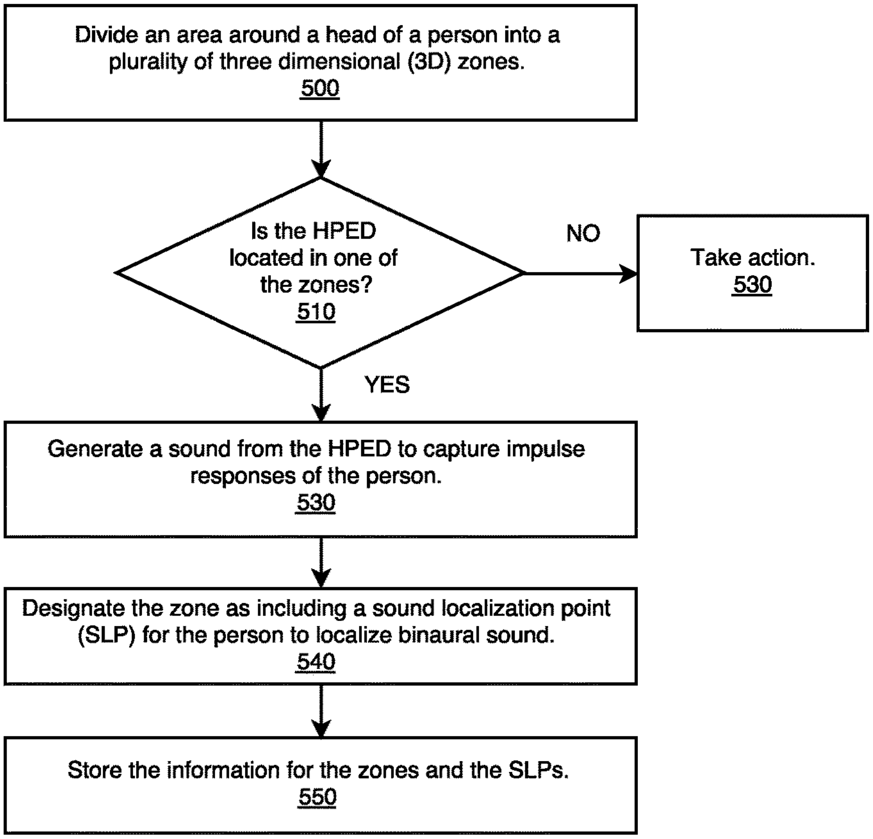
FIG. 5 is a method to designate one or more SLPs to a zone or area around a head of a person in accordance with an example embodiment.

FIG. 5 is a method to designate one or more SLPs to a zone or area around a head of a person. This method assists the person in managing his or her SLPs.

Block 500 states divide an area around a head of a person into a plurality of three-dimensional (3D) zones.

Areas around the head of the person are divided into a plurality of different zones. The zones can have similar, same, or different sizes and shapes that include regular or irregular 3D shapes including, but not limited to, one or more of a sphere, a cube, a cuboid, a cone (including truncated cones), arc, a cylinder, a pyramid (including a square-based pyramid), a tetrahedron, a triangular prism, polyhedrons, uniform 3D shapes, hemisphere, a partial sphere, a portion or slice of a sphere, non-uniform or irregular 3D shapes, and other shapes.

Consider an example in which the head of the person is centered at an origin (0, 0, 0) of an X-Y-Z coordinate system or spherical coordinate system. An imaginary sphere of radius (r) encircles the head with the head at the origin. This sphere is further divided into areas, pieces, or zones. For example, the sphere is cut or divided into a plurality of horizontal cross sections, vertical cross-sections, cones, or other 3D shapes. Each zone represents a location where one or more SLPs can be derived or exist.

The following illustrates an example to define an area above a head of the person whose head is centered at the imaginary sphere. Consider an example in which an imaginary horizontal plane cuts through this sphere above the head of the person such that a spherical cap defines an area above this horizontal plane. This spherical cap can be further divided into zones by cutting the spherical cap with imaginary horizontal, vertical, or angled planes. One or more SLPs can be designated into each zone. Alternatively, a zone can be designated with no SLPs.

Block 510 makes a determination as to whether the HPED is located in one of the zones.

For example, when the head of the person is positioned at an origin (0, 0, 0) of the coordinate system, then the location of the HPED can be calculated with respect to this position. For instance, its location (r, θ, ϕ) or (x, y, z) with respect to the face of the person (i.e., the origin) can be calculated as discussed herein. The location is then compared with the coordinates of the zones to determine into which zone the HPED currently resides.

The HPED can actually have multiple location designations. One designation is its location in space relative to the head of the person, such as designating the location of the HPED at (r, θ, φ) or (x, y, z). Another designation is its GPS or physical location, such as 22° 33' and 114° 14'. Another designation is a name of a physical location, such as an address, name of a building, name of a room, etc. Another designation is a name or designation of a zone or area around the head of the person, such as an area around the head of the person having ten zones and the HPED being located in Zone 3.

An example embodiment compares a current location of the HPED with respect to the locations of the zones around the head of the person. This comparison reveals in which zone the HPED is currently located.

A determination as to whether the HPED is located in a zone and an identification of that zone depends on a number of factors, such as the number of zones, the size of the zones, the shape of the zones, the distance between the HPED and the person, etc.

Consider an example in which a head of the person is a center of sphere that is divided into multiple segments or zones. One of these zones (designated as Zone A) exists as a top portion of this sphere formed from a horizontal plane that dissects the sphere above the head of the person (previously provided as an example of a spherical cap in the discussion of block 500). If the sphere has a radius (R), and Zone A has a height (h) and its own base radius (r), then the volume of Zone A (i.e., the spherical cap) is given by the following equation:

$$V(\text{Zone }A)=1/6\cdot\pi\cdot h\cdot(3r^2+h^2).$$

Using the Pythagorean theorem ($A^2+B^2=C^2$), results in the following equation:

$$(R-h)^2+r^2=R^2.$$

Solving for the base radius (r), yields:

$$r=(h(2R-h))^{1/2}.$$

The angle (α) between the normal to the sphere at the bottom of the spherical cap and the base plane can be calculated with the following equation:

$$R-h=R\sin\alpha,$$

$$\alpha=\sin^{-1}((R-h)/R)).$$

Further, a geometric centroid (z) of the spherical cap (i.e., Zone A) occurs per the following equation:

$$z=(3(2R-h)^2)/(4(3R-h)).$$

These equations, along with the location of the HPED at (r, θ, φ) or (x, y, z), determine whether the HPED is located in the spherical cap, Zone A.

Of course, these equations represent an example of how geometry and coordinates can be used to determine whether the HPED is within a particular zone around the user. Other equations and computations can be used and depend on the size, shape, and locations of the zones and HPED. Furthermore, other methods can be used to determine in which the zone the HPED is located.

If the answer to this determination is "no" then flow proceeds to block 520 that states take an action.

An action occurs when the HPED is not within a zone. For example, the HPED may be too far away from the person or may be too close to the person. As another example, the HPED may be located in an area that does not include a zone, such as being under the person or in a pocket of the person. Further, a zone may already have a sufficient number of effective SLPs.

Example actions include, but are not limited to, providing the user or other person with a sound warning (e.g., playing a sound warning from the HPED), providing the user or other person with a visual warning (e.g., displaying a visual indication on the HPED, such as a text or light or an image), displaying a visual indication of the zone or zones so the user can move to or navigate to the zone and correct location, providing verbal instructions that indicate where the user should physically move so the user and/or HPED is within a particular zone, preventing the HPED from generating the sound to capture the impulse response (e.g., the HPED will not automatically generate the sound), allowing the HPED to generate the sound (e.g., the HPED generates the sound but notes a warning or designation with the facial orientation), instructing the user or other person to change the facial orientation or the orientation of the HPED (e.g., providing a written message or announcement from a voice to move or rotate the HPED and/or change a head orientation of the person), capturing multiple impulse responses from the same location or other locations proximate to the location (e.g., capturing more impulse responses when the listener and/or HPED does not have a specified or correct orientation), processing the impulse responses to compensate for the facial orientation, or taking another action.

If the answer to this determination is "yes" then flow proceeds to block 530 that states generate a sound from the HPED to capture impulse responses for the person.

The HPED generates the sound to capture the impulse responses at the microphones located in the ear of the listener.

Block 540 states designate the zone as including a sound localization point (SLP) for the person to localize binaural sound.

A record of information is kept with respect to each zone. This information includes, but is not limited to, one or more of a location of a zone, a size and shape of a zone, a creation date and time of a zone, a number of SLPs in the zone, a location of each SLP in the zone (e.g., in what part of the zone is the SLP located), a number of times and duration of time a zone or SLP in the zone is used to localize sound, which sounds and sound types localize to which SLPs, an effectiveness or accuracy of a user to localize sound to the SLP in a zone, voices or people or contacts designated to a SLP, names of each zone and each SLP, and other information discussed herein.

Block 550 states store the information for the zones and the SLPs.

This information includes information discussed herein with respect to the zones and the SLPs.

The zones and SLPs can also be mapped to provide a user with a 2D or 3D visual indication of the zones and a location of the SLPs in the zones. For example, the HPED displays an image of the zones and where the SLPs are located in each zone. The image can also include other information, such as names, types, color descriptors, and other portions of the information.

Impulse responses can be particular to a location or type of location when the impulse responses include noise reverberations, such as noise reverberations caused from a size of the location, a shape of the location, objects at the location, environmental conditions at the location, etc. These impulse responses occur in the form of RIRs that are included in the BRIRs captured at the microphones of the ears of the listener when the HPED generates the sound. RIRs can also be added to or removed from the sound after the impulse responses are recorded, such as adding a high-ceiling effect so the sounds appear to originate in a cathedral.

Problems can exist when a user has many different stored impulse responses for different occasions, different locations, different purposes, etc. and it can be difficult to manage these various impulse response sets or transfer functions associated with the impulse responses. For instance, a user could have a series of SLPs for voice calls, and each of these SLPs can have a different BRIR. Some SLPs provide the listener with a sound effect so that a voice of the speaker appears to originate at the beach, at an office, at a home, or at another location. Further, the user could have designated or captured some SLPs at his house and captured others at his office. Each SLP can have a set of rules to determine when it should be activated to localize a sound.

Figure 6:
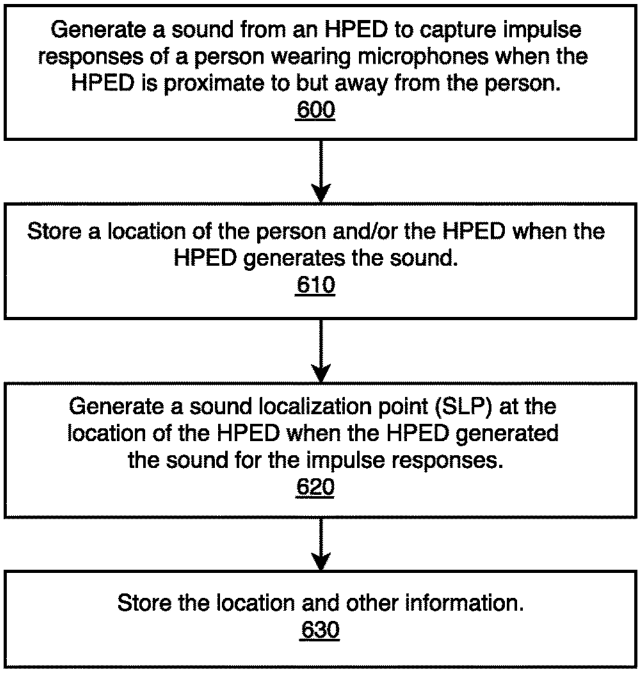
FIG. 6 is a method to map a SLP to a location in accordance with an example embodiment.
Figure 7:
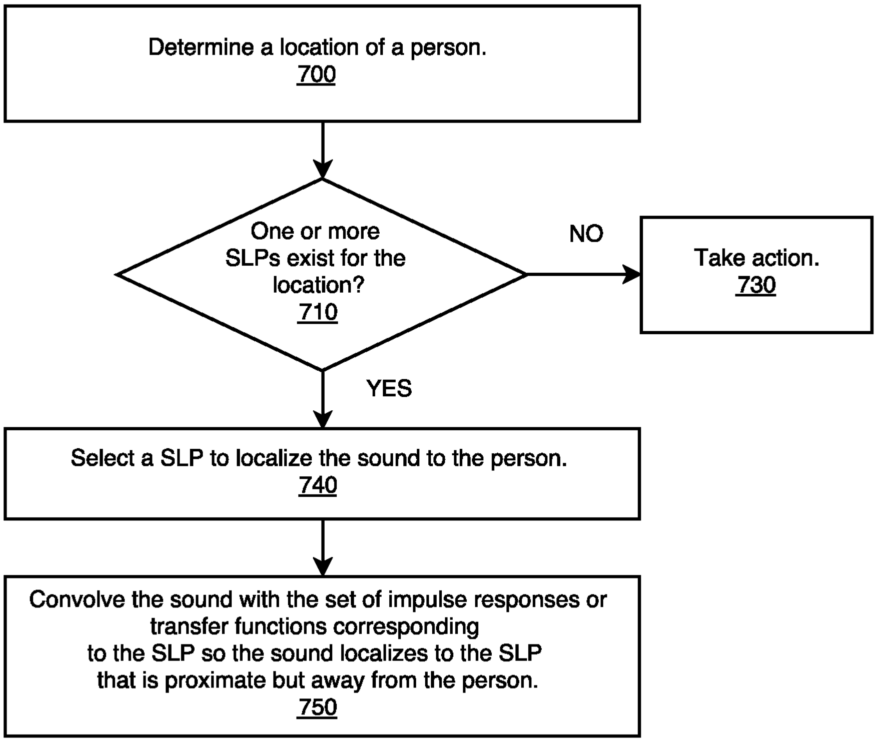
FIG. 7 is a method to select a SLP for a person and convolve sound to localize at the SLP in accordance with an example embodiment.

Example embodiments, including those discussed in FIGS. 6 and 7, address these technical problems and others discussed herein.

FIG. 6 is a method to map a SLP to a location.

Block 600 states generate a sound from a HPED to capture impulse responses of a person wearing microphones when the HPED is proximate to but away from the person.

The HPED generates a sound or causes another electronic device to generate a sound that is used to capture impulse responses at microphones located in, at, or near the ears of the person.

Block 610 states store a location of the person and/or the HPED when the HPED generates the sound.

A location of the HPED and/or person is stored and can be retrieved, processed, transmitted, etc. The information stored is not limited to location, but also includes a facial or head orientation of the person, coordinate information regarding the person and/or HPED (including (r, θ, ϕ) or (x, y, z) discussed herein), an address of the person and/or HPED when the impulse response was generated, a description or an identification of the location (such as labeling the location according to room type, like “bedroom” or “office”), and other information discussed herein.

Block 620 states generate a SLP at the location of the HPED when the HPED generated the sound for the impulse responses.

When sound is subsequently convolved with the impulse responses for this location, the sound will appear to originate relative to the listener at the location of the HPED at the instant in time when the HPED generated the sound. Example embodiments set or establish a SLP for this location.

Further, a SLP can be provided with a descriptive name so a user can recognize the SLP and/or its location. For instance, a user captures an impulse response in her bedroom when her HPED is four feet from her face. The location of the HPED represents where she wants to localize her husband’s voice when he calls her. A SLP designates to this location and is stored as “Telephony Husband” so she can distinguish this SLP from other SLPs that are designated to her.

Block 630 states store the location and other information.

The information is stored in the HPED and/or stored in another location, such as stored on a server, another electronic device, a database, memory, a cloud, etc.

Block 640 states provide the SLP to a map for subsequent retrieval.

In addition to storing the information, it can be provided to the person in a visual and/or audio context. An example embodiment maps the SLP and other information into a 2D or 3D map so the person can easily and quickly see the SLP and relevant information associated with it. The SLP and accompanying information can be retrieved and viewed on or through a display, such as being viewed on an electronic device (such as a computer or television), a HPED, electronic glasses, a head-up display or other display adapted for virtual reality (VR) or augmented reality (AR), or other type of wearable electronic device.

Consider an example in which Alice wears earphones with microphones and uses her HPED to capture numerous BRIRs in different rooms while in her house. A SLP designates for each BRIR. An example embodiment builds or retrieves a 3D interactive map of her house and places each SLP at its corresponding location in the map. Alice displays the map on her HPED and sees where each SLP is located. Further, the HPED knows the location of each SLP in order to select or recommend a SLP for Alice, such as an intelligent personal assistant recommending or selecting a SLP for Alice.

FIG. 7 is a method to select a SLP for a person and convolve sound to localize at the SLP.

Block 700 states determine a location of a person.

Example methods to locate a person include, but are not limited to, tracking a person and/or HPED with GPS, tracking a smartphone with its mobile phone number, tracking a HPED via a wireless router or wireless network connection to which the HPED communicates for Internet access, tracking a person and/or HPED with a tag or barcode, tracking a person and/or HPED with a radio frequency identification (RFID) tag and reader, tracking a location of a person with a camera (such as a camera in conjunction with facial recognition), and tracking a location of a person with a sensor. Alternatively, a person can provide his or her location (such as speaking a location to an intelligent personal assistant that executes on a HPED).

Consider an example in which a smartphone executes an application that tracks and shares its current location in real-time with other applications, electronic devices, and/or example embodiments discussed herein.

Block 710 makes a determination as to whether one or more SLPs exist for the location.

SLPs can be stored or associated with locations, including zones, areas, places, rooms, etc. When a person goes to or near a location, then the SLPs associated with this location are retrieved. For example, a HPED of a person compares its current location with the locations of SLPs stored for the person to determine whether one or more SLPs exist for the location.

The determination as to whether a SLP exists for a particular location can be based on one or more factors. These factors can determine how or which SLPs are selected.

For example, one factor is proximity of the person and/or HPED to the SLP or location where the impulse responses associated with the SLP were generated. A SLP can be selected based on its proximity to the person and/or HPED. For instance a SLP closest to the person and/or HPED is selected.

Another factor is the RIR associated with the SLP. For example, a closest SLP may not be appropriate if this SLP has an RIR that is not associated with the current location of the person. Consider an example in which Alice has many SLPs throughout her house. Each SLP includes RIRs for the particular room in which the SLP is located. SLPs in the bathroom are convolved with bathroom RIRs; SLPs in the bedroom are convolved with bedroom RIRs; etc. When Alice receives a call, the voice of the caller is convolved with a RIR corresponding to the location of Alice. While standing in the hallway, Alice receives a call from Bob on her smartphone. The closest SLP is a bathroom BRIR that is located a few feet from Alice. Since Alice is not in the bathroom, her smartphone selects a bedroom BRIR since the HPED senses her walking direction and predicts she will enter this room shortly and not the bathroom.

Another factor is historic usage or personal preferences. When the person was previously at this location, he or she localized sound with a particular SLP and BRIR, and this SLP and BRIR are recommended for this location based on the past selection. For example, a user has a favorite SLP to use for voice calls, or has a specific SLP used for calls with a particular friend regardless of their location at the time of a call.

If the answer to this determination is "no" then flow proceeds to block 730 that states take action.

An action occurs when a SLP or impulse response does not exist for the current location of the person. For example, the person enters a room or location for the first time, and no RIRs or BRIRs exist for this location.

Example actions include, but are not limited to, choosing a generic impulse response in order to convolve the sound (e.g., choosing a BRIR taken from or associated with another physical location); choosing a RIR or BRIR not particular to the location but associated with the location (e.g., when the person is in a car for which no RIR exists, then choosing a RIR from another car); instructing the user to capture a BRIR for this location; playing a particular ringtone that signifies to the user that a SLP or impulse response is not available for the current location; selecting to localize the sound at a predetermined location with no RIR information (e.g., localize the sound with individualized HRTFs of the user that do not include RIRs); providing the user or other person with a sound warning, providing the user or other person with a visual warning, denying the HPED from localizing sound (e.g., providing the sound in stereo or mono to the person instead of providing binaural sound that localizes to an external location); instructing the user or other person to move to another location where a SLP or impulse response was previously captured for the person; or taking another action (such as an action discussed herein).

If the answer to this determination is "yes" then flow proceeds to block 740 that states select a SLP to localize the sound to the person.

An electronic device chooses one or more available SLPs and their associated impulse responses or transfer functions to convolve sound so the sound localizes to the selected SLP.

Block 750 states convolve the sound with the set of impulse responses or transfer functions associated with the selected SLP so the sound localizes to the SLP that is proximate but away from the person. Sound is convolved so it localizes to the person at the SLP.

Voice telephony is more realistic when the voices are localized to include RIRs for the current location of the listener. One problem is that the electronic device of the listener may not have RIRs for his current location and hence cannot convolve sounds with impulse responses from the location.

Figure 8:
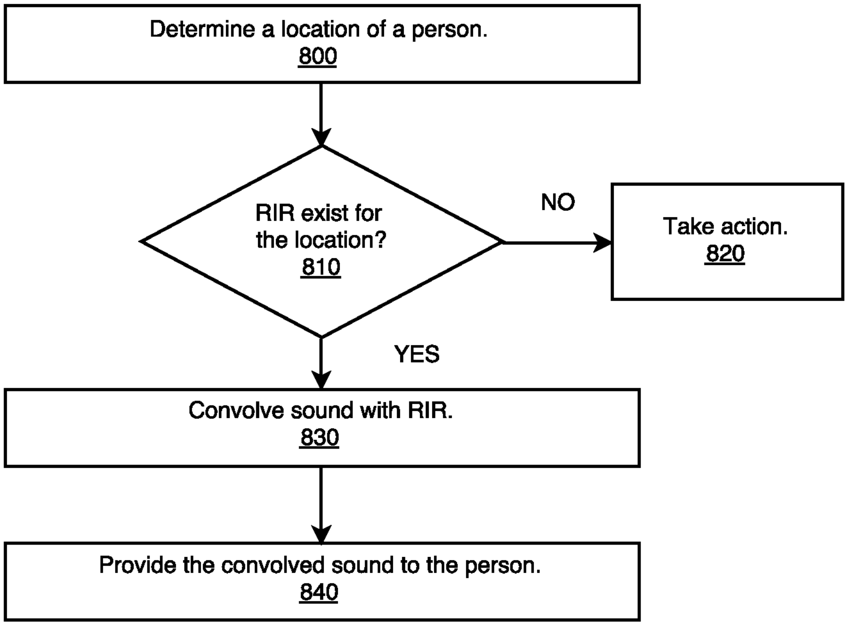
FIG. 8 is a method to retrieve RIRs and convolve sound based on a location of a person in accordance with an example embodiment.
Figure 9A:
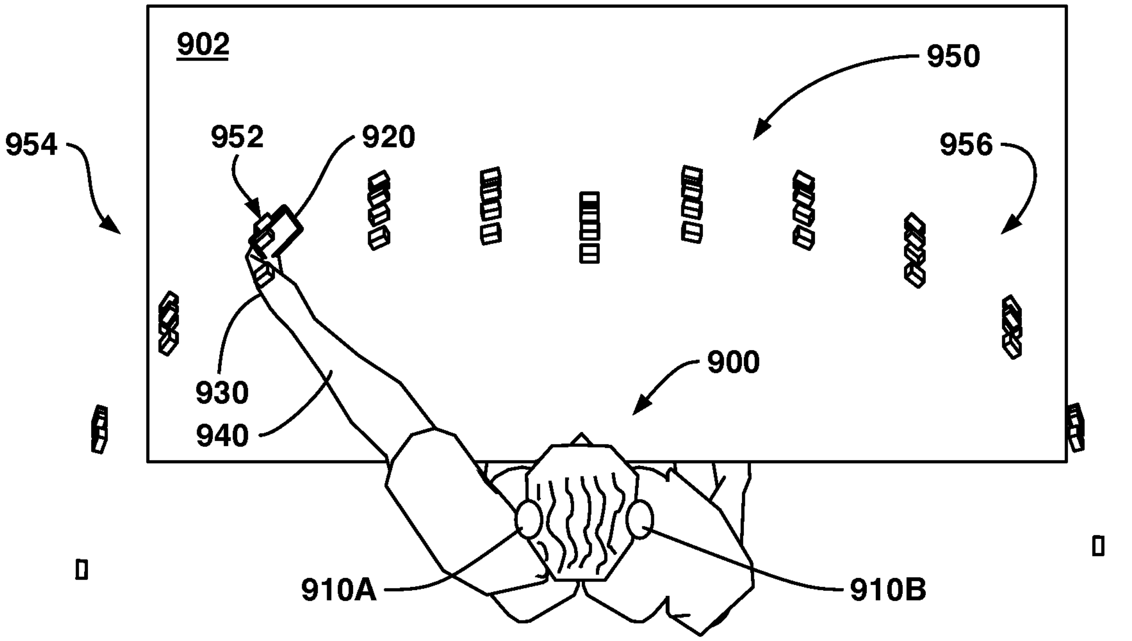
FIG. 9A is a top view of a person capturing audio impulse responses in accordance with an example embodiment.
Figure 9B:
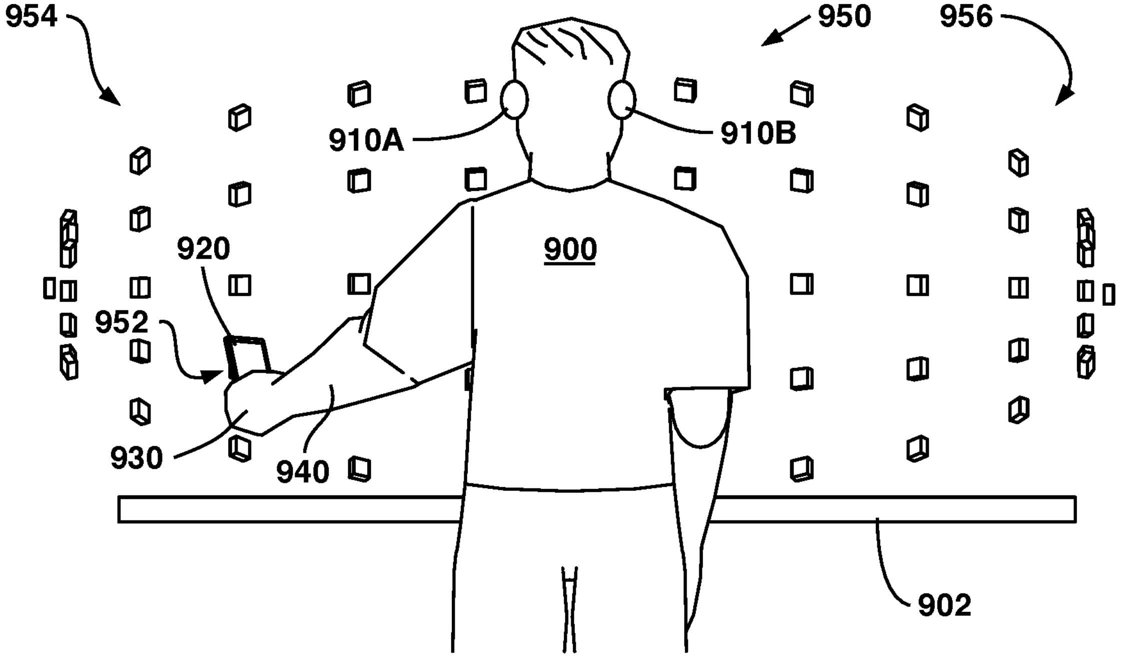
FIG. 9B is a back view of the person of FIG. 9A in accordance with an example embodiment.
Figure 9C:
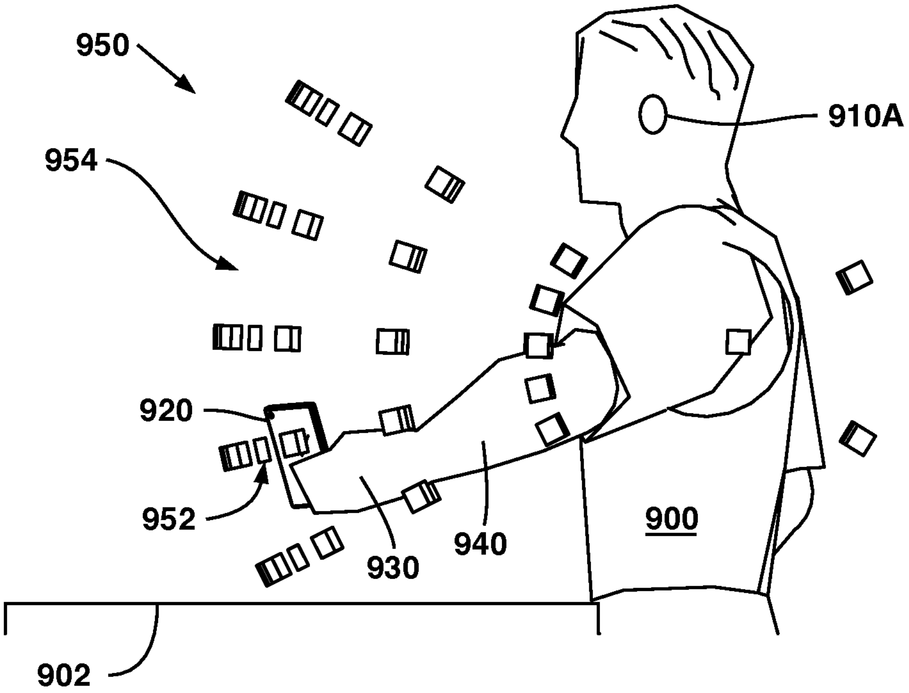
FIG. 9C is a side view of the person of FIG. 9A in accordance with an example embodiment.
Figure 9D:
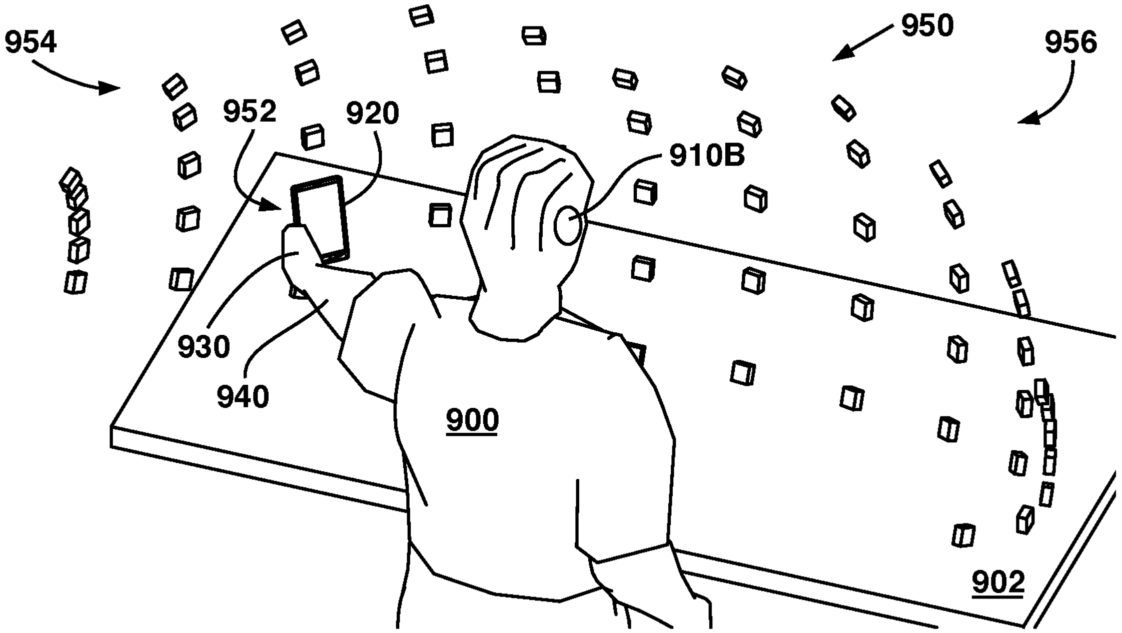
FIG. 9D is a top corner view of the person of FIG. 9A in accordance with an example embodiment.

FIG. 8 and other example embodiments address this problem and others.

FIG. 8 is a method to retrieve RIRs and convolve sound based on a location of a person.

Block 800 states determine a location of a person. The location of the person can be determined as described in connection with block 700 or other blocks discussed herein.

Block 810 makes a determination as to whether a RIR exists for the location.

RIRs can be stored and associated with locations. When a person goes to or near a location, then the RIRs associated with this location or location type are retrieved. For example, a HPED of a person compares its current location with the locations of stored RIRs available locally and online and determines whether one or more RIRs exist for the location or are suitable for the location.

In one example embodiment, the HPED or other electronic device of the person captures the RIRs for the location. For example, while the person is at the location, a HPED of the person generates a sound, and electronic microphones capture impulse responses for the sound. In another example embodiment, the HPED or other electronic device retrieves RIRs for the location. For instance, RIRs are stored in a database or memory for various locations around the world, and these RIRs are available for retrieval. These RIRs can be actual ones captured at the location or computer generated or estimated RIRs for the location. As yet another example, the HPED or electronic device retrieves RIRs for a similar location. For instance, if the location is a church but no RIRs exist for this particular church, then RIRs for another church are retrieved. Physical attributes of the location (such as size, shape, and other physical qualities) can be used to more closely match RIRs from other locations.

In example embodiments, reverberation can be physically measured or digitally simulated. For example, to apply a reverberation effect, an incoming audio signal is convolved with an impulse response. Convolution multiplies the incoming audio signal with samples in the impulse response file. Various impulse responses for specific locations (ranging from small rooms to large areas) can be retrieved from memory and then used in convolution reverb applications to provide an audio signal with acoustic characteristics that are particular to the specific location.

Consider an example in which a transfer function or frequency response for an area (such as a room or other location) is measured with a sound that covers the frequency spectrum. For instance, a white noise excites the area, and the noise is recorded at locations near the source and another location in space. Coefficients of an impulse response are generated as an inverse Fourier Transform.

Consider an example of convolution reverb in which one or more microphones are placed in a room and a brief pulse sound is generated. The microphones capture both the original sound and the response or reverberations from the room to generate RIRs for the room.

If the answer to this determination is "no" then flow proceeds to block 820 that states take an action.

An action occurs when an RIR or impulse response does not exist for the current location of the person. For example, the person enters a room or location for the first time, and no RIRs or BRIRs exist for this location.

Example actions include those discussed in connection with block 730 and/or taking another action (such as an action discussed herein).

If the answer to this determination is "yes" then flow proceeds to block 830 that states convolve sound with the RIR.

Block 840 states provide the convolved sound to the person.

For example, an electronic device convolves the sound and provides it to the person through speakers, such as speakers in earphones, wearable electronic device, or loud speakers.

Consider several examples in which Alice prefers to localize voices on phone calls with RIRs captured from the physical location where she is talking to increase realism. This preference is set on her smartphone.

Alice receives a VoIP call from Bob while she is at her grandmother's house. Her smartphone determines that Alice has not previously received a call at this location and hence is unable to retrieve either a RIR or BRIR for her current location. In response to this determination, the smartphone rings with a distinctive tone, and Alice recognizes this tone and its implication that no RIRs or BRIRs are available for her location. This distinctive tone is actually the sound used to capture impulse responses. While her smartphone is ringing and generating this distinctive tone, Alice holds the smartphone in her hand with her arm stretched out away from her face. Microphones in her earphones record the tones, and her smartphone immediately generates BRIRs for Alice. When the smartphone captures sufficient impulse response from a designated location, it stops generating the tones, answers the call, and convolves the incoming voice with the BRIRs that it just obtained while Alice was answering the phone call.

Consider the example above in which Alice is at her grandmother's house when she receives a voice call but her smartphone does not have RIRs or BRIRs for her location. Alice answers the call and talks with a headset that includes microphones and speakers. A voice of the caller localizes to a SLP that is proximate to Alice with her HRTFs, but the voice is not convolved with RIRs because they do not exist for her current location. During the call, Alice asks Bob to generate a RIR reference impulse. Bob walks several feet away from Alice and activates his phone to generate a distinctive tone. The microphones in Alice's ears recognize the tone as one to generate impulse responses for her current location. Based on these impulse responses, her smartphone generates BRIRs particular to Alice and her location and then determines the RIRs for the room using the new BRIR and her known HRTF. Alice continues the conversation with convolution now including the room's RIR, and without changing her SLP.

Consider the example above in which Alice is at her grandmother's house when she receives a call but her smartphone does not have RIRs or BRIRs for her location. Her smartphone determines that Alice has not previously received a call at this location and rings with a distinctive tone. This tone, however, is not the tone to capture the impulse responses for Alice and the room. Instead, the tone alerts Alice that such impulse responses are missing or that she is missing individualized HRIRs for her location. Alice moves the smartphone to a location proximate to her face to where she would like to localize the voice of the caller. The smartphone continues to ring, but tracks its location. When the smartphone moves to the correct location (e.g., to a particular zone prearranged by Alice or to a location to measure a far-field HRTF), or when Alice indicates the location is correct, the smartphone generates a specific tone designed to capture audio impulse responses, such as generating a frequency-swept sine wave or other sound. Based on these impulse responses, her smartphone generates BRIRs particular to Alice and her location. Alice answers the call, and her smartphone convolves the caller's voice with the newly captured BRIRs and localizes it to a SLP that is away from but proximate to Alice.

FIGS. 9A-9D show a person 900 standing next to a table 902 and capturing audio impulse responses with microphones 910A and 910B in his left and right ears. The person 900 holds a hand held portable electronic device (HPED) 920 in his hand 930 with his left arm 940 straight and extended away from his body.

When the left hand 930 is located away from the face of the person 900 with the arm in an outstretched position, the HPED 920 (such as a smartphone) generates a specific sound or tone to generate audio impulse responses at the microphones 910A and 910B. The HPED 920 or another electronic device processes the impulse response to generate HRIRs, BRIRs, RIRs, and/or HRTFs that are used to convolve sound to the person.

When sound is subsequently convolved with the impulse responses or transfer functions, the sound localizes for the person 900 to the location where the HPED 920 was when it generated the sound or tone. These locations are stored as sound localization points or SLPs.

FIGS. 9A-9D show a plurality of SLPs 950 formed around the person 900. Each SLP represents a location where the person generated a sound or tone with the HPED 920 and captured the impulse response with the microphones 910A and 910B located in his ears. By way of example, the figures show the person 900 activating the HPED 920 to generate a sound or tone at SLP 952. The HPED 920 or another electronic device (such as a cloud server) stores the locations of the SLPs and other information associated with them.

As shown in FIGS. 9A-9D, the SLPs 950 form a pattern (such as a partial sphere) around the head or body of the person 900. A first set of SLPs 954 form a partial sphere around a left side of the person, and a second set of SLPs 956 form a partial sphere around a right side of the person. SLPs 954 were generated when the HPED 920 was extended outwardly in the left hand 930 of the person 900, and SLPs 956 were generated when the HPED 920 was extended outwardly in the right hand of the person 900. A length of each arm serves as a radius for the partial spheres.

FIGS. 9A-9D show the SLPs formed around the person in a structured pattern. The SLPs, however, can occur at various locations, such as arbitrary locations where the person places the HPED and generates the tone to capture the impulse responses with the microphones.

Example embodiments enable the person to select locations for where to generate the SLPs. The person can select not only where to position a SLP but also how many SLPs to generate and/or store. For example, one person may want to generate one or two SLPs for localizing sound, while another person may want to generate hundreds of SLPs for localizing sound from one or more distances.

Figure 11:
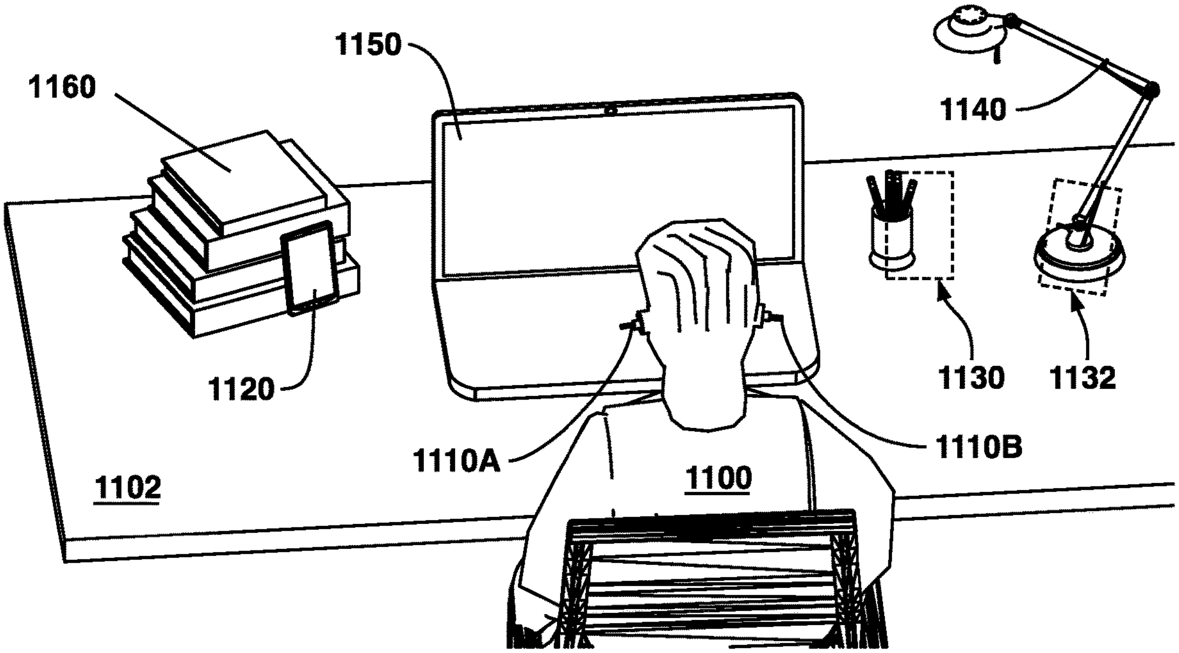
FIG. 11 shows a person sitting at a table and capturing audio impulse responses with microphones in his left and right ears in accordance with an example embodiment.
Figure 12:
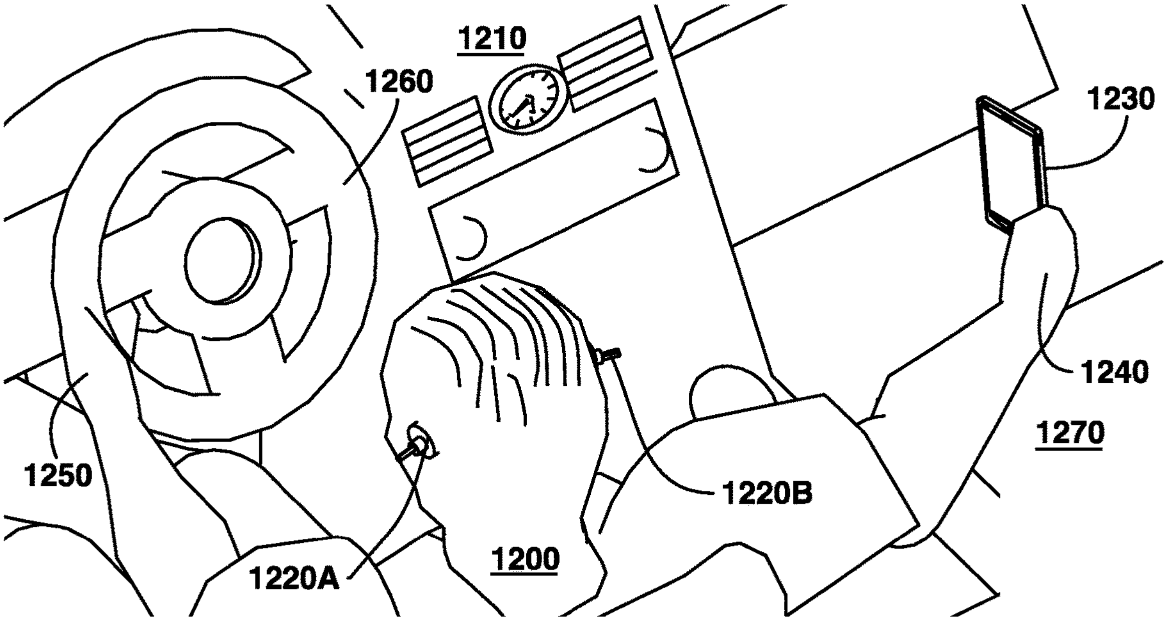
FIG. 12 shows a person sitting in an automobile and capturing audio impulse responses with microphones in his left and right ears in accordance with an example embodiment.

Example embodiments are not limited to capturing impulse responses and generating SLPs while a HPED is being held in a hand of a person. People have significant flexibility in deciding where to place a SLP such as deciding distances and angles of a location, and one or more of $(r, \theta, \phi)$. This flexibility further includes allowing people to place SLPs at, on, or near objects, such as placing their HPED on an object and generating the sound from this location. FIGS. 10-12 illustrate some additional examples of these flexibilities.

FIGS. 10A-10D show a person 1000 standing and capturing audio impulse responses with microphones 1010A and 1010B in his left and right ears. The person 1000 holds a pole, rod, or selfie-stick 1020 that attaches or connects to a HPED 1030. A plurality of SLPs 1040 encircles or surrounds the person 1000.

When the HPED 1030 is connected to one end of the pole 1020, the person 1000 can position the HPED at a much farther distance from his face than if he were holding the HPED in his hand and extending his arm. In this manner, the person can generate and capture far-field HRTFs since the combined length of his arm and the selfie-stick is greater than about 1.0 meter. Depending on the length of a person's arm and a length of the pole, the person can generate and capture impulse responses from 1.0-2.0 meters or more from his ears. For example, a person could generate sounds with a smartphone positioned about three feet to about eight feet from the face of the person. The pole thus ensures that the person generates and captures far-field audio impulse responses and provides more flexibility to generate SLPs in a number of locations.

Figure 10A:
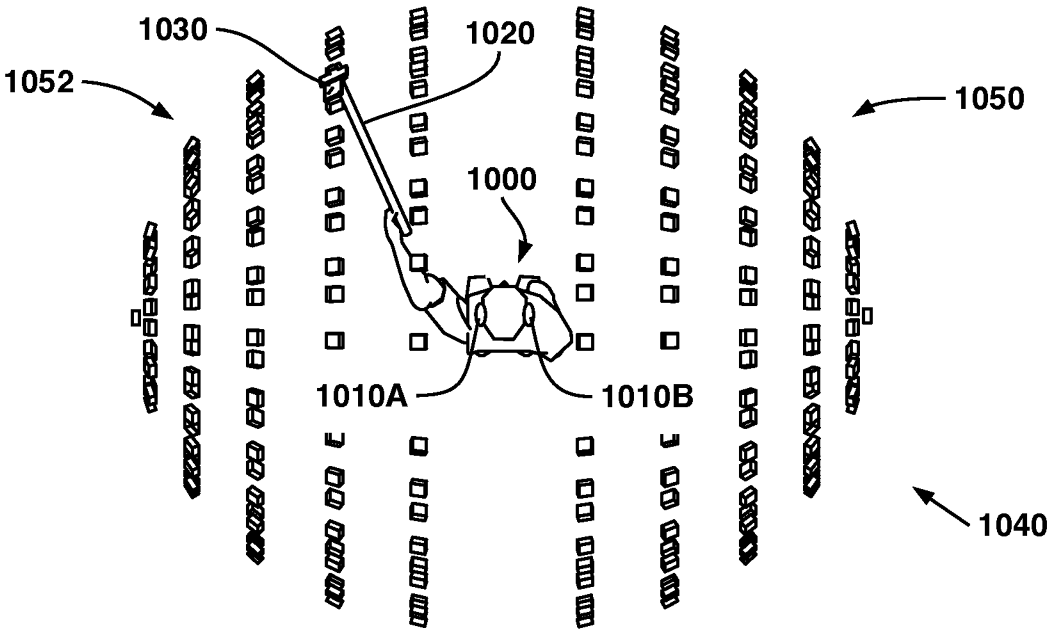
FIG. 10A is a top view of a person capturing audio impulse responses with a HPED attached to a pole in accordance with an example embodiment.
Figure 10B:
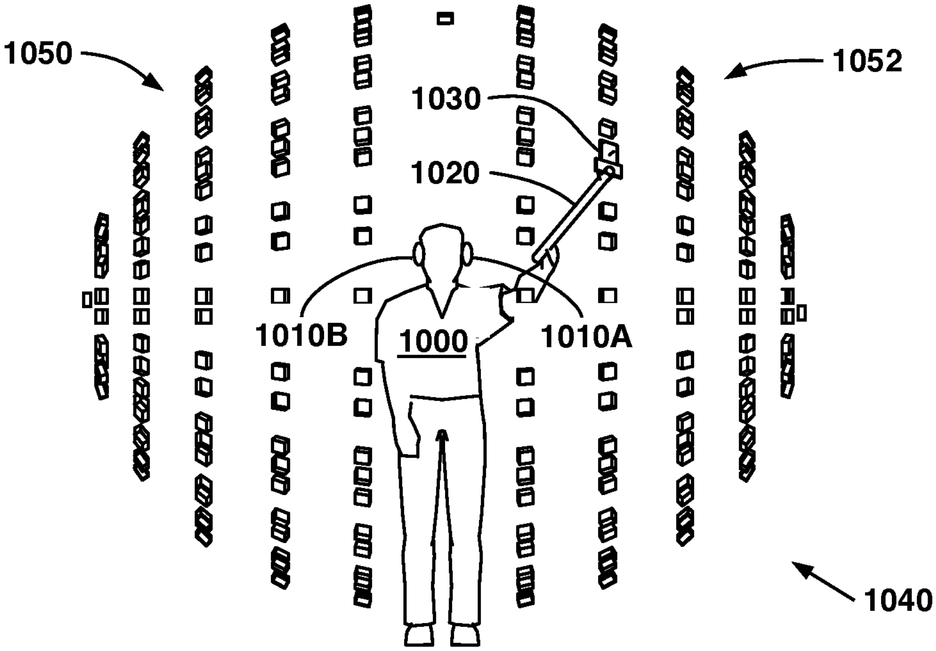
FIG. 10B is a front view of the person of FIG. 10A in accordance with an example embodiment.
Figure 10C:
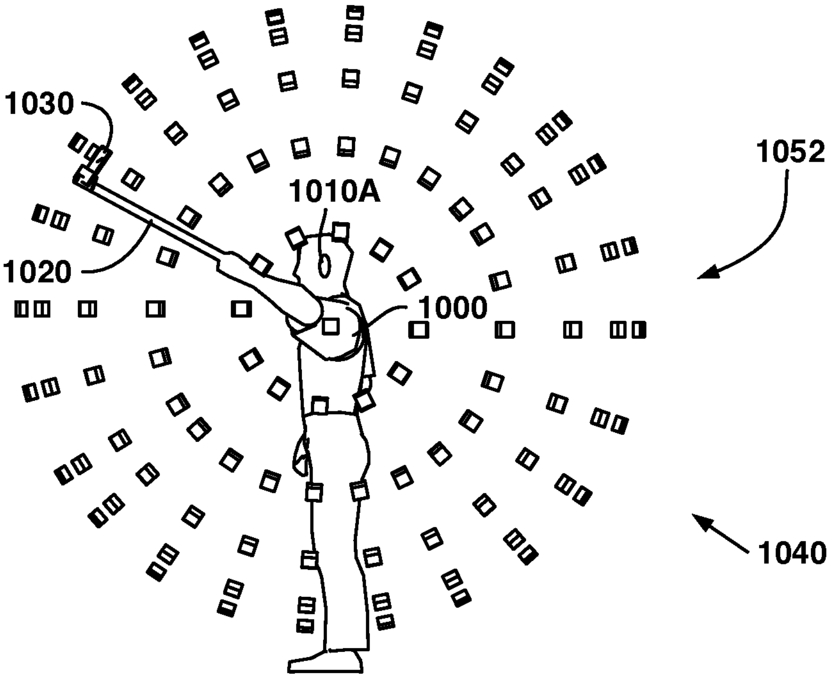
FIG. 10C is a side view of the person of FIG. 10A in accordance with an example embodiment.
Figure 10D:
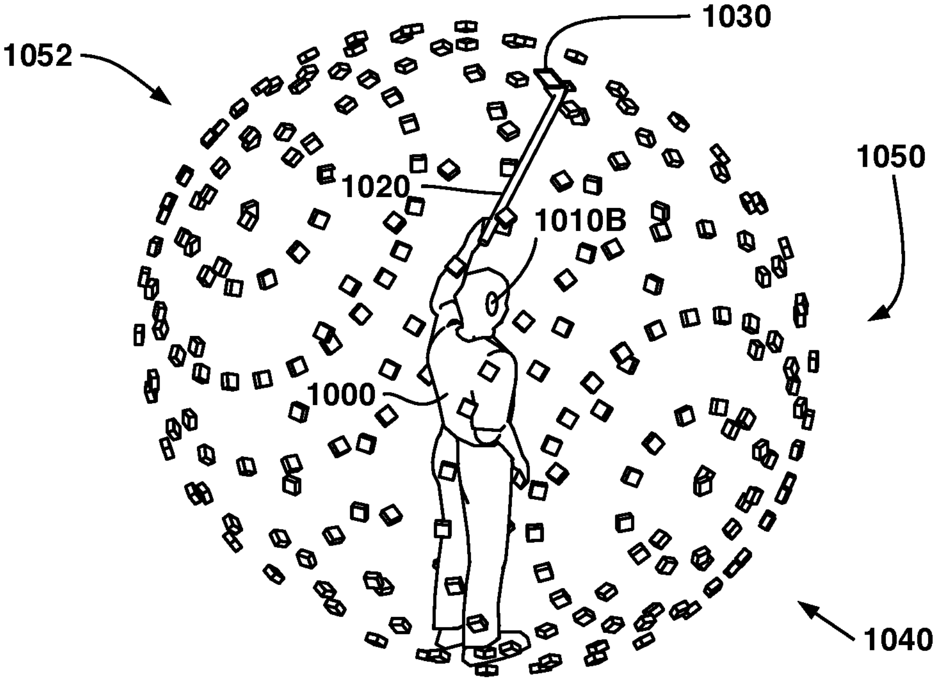
FIG. 10D is a top corner view of the person of FIG. 10A in accordance with an example embodiment.

FIGS. 10A-10B show an example configuration of SLPs 1040 that were captured with left and right arms of a person 1000. A right hemisphere of SLPs 1050 forms on a right side of the person, and a left hemisphere of SLPs 1052 forms on a left side of the person.

As noted, a spherical configuration of SLPs is an example shape since the person can place SLPs at a variety of different locations according to his or her desires. SLPs are not restricted or confined to a particular distance or configuration around the person. Instead, locations and numbers of the SLPs are user-selected. This is contrary to traditional systems (such as an anechoic chamber) in which the number and location of the speakers (which coincide to the SLPs) were fixed and not user-selected.

FIG. 11 shows a person 1100 sitting at a table 1102 and capturing audio impulse responses with microphones 1110A and 1110B in his left and right ears. While a HPED 1120 sits on the table 1102, the HPED generates a tone or sound that the microphones capture as the impulse responses. The location of the HPED when it generates the sound represents the SLP to where subsequent sound is convolved and localized for the person.

FIG. 11 shows two SLPs 1130 and 1132 that were previously generated when the HPED was at the respective locations. For instance, when the HPED was placed next to the lamp 1140, the HPED activated the sound to generate the impulse response, and the SLP 1132 was subsequently created for that location. Likewise, when the HPED as placed next to the computer 1150, the HPED activated the sound to generate the impulse response, and the SLP 1130 was created for that location. The HPED is currently resting next to some books 1160 and is ready to generate another SLP for the person.

FIG. 11 shows that a person is not required to hold the HPED when generating the tone and capturing the impulse responses. Instead, the HPED is set or placed at a location, and it generates the tone from this location. This embodiment provides the person with much flexibility in determining where to generate a SLP. The person in FIG. 11, for example, can generate SLPs on his table and position these SLPs at locations convenient or desirable to him. For example, the person 1100 can designate the SLP 1132 as a "virtual right speaker" and a SLP created from an impulse response at the HPED 1120 as a "virtual left speaker." FIG. 12 shows a person 1200 sitting in an automobile 1210 and capturing audio impulse responses with microphones 1220A and 1220B in his left and right ears while holding a HPED 1230 in his right hand 1240. The left hand 1250 remains on the steering wheel 1260 of the automobile as the person continues to drive and look straight ahead toward the road.

The HPED 1230 generates a specific sound or tone used to generate audio impulse responses that can be used to create localized sound at a SLP. In this instance, the SLP is located to a right side of the person and at a passenger seat 1270 of the automobile. Subsequent sounds (including voices) can be localized to this SLP at the passenger seat 1270. For example, the person can communicate with an intelligent user agent or autopilot whose voice localizes to the SLP at the passenger seat or communicate with another person during a phone call with the other person's voice localizing to the passenger seat 1270.

Example embodiments enable users to generate SLPs at locations specified or desired by the users. Furthermore, these SLPs can be close to the person (such as near-field locations) or farther from the person (such as far-field locations). Further yet, users can generate a SLP and immediately begin to localize sound to this location. For example, once the microphones detect the impulse responses, the HPED processes them to derive transfer functions. The HPED then convolves sound input signals with the transfer functions so the sound localizes to the location or origin of the sound (i.e., where the HPED or other sound source was physically located when it generated the sound for the impulse responses).

Figure 13:
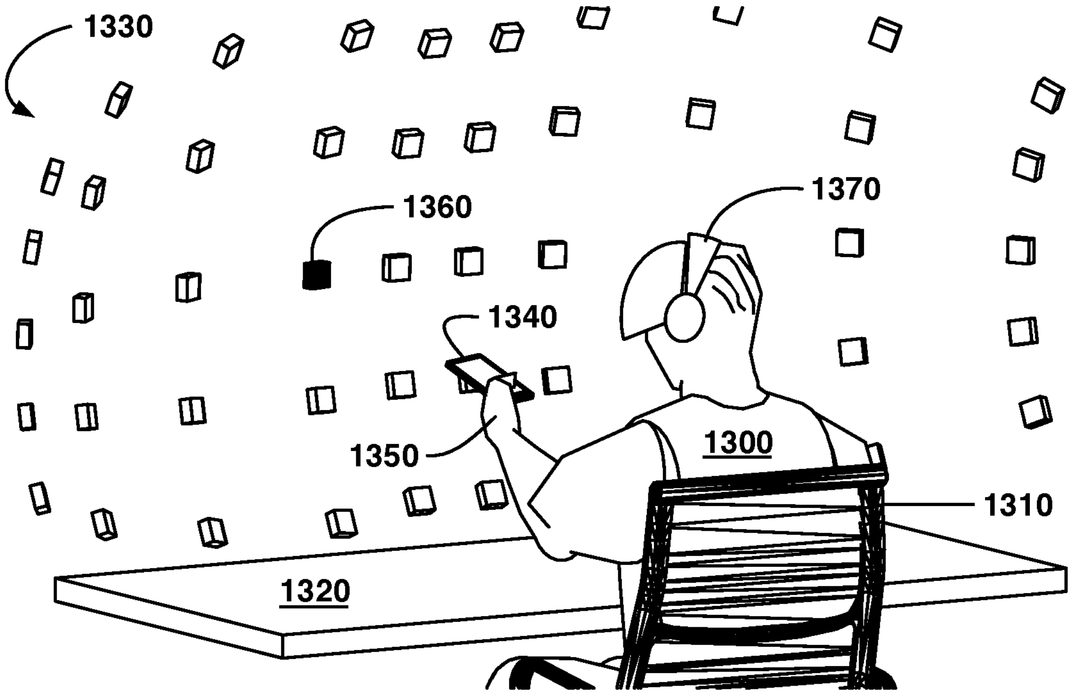
FIG. 13 shows a person sitting in a chair at a table and being surrounded by a plurality of SLPs that are located away from but proximate to his face in accordance with an example embodiment.

FIG. 13 shows a person 1300 sitting in a chair 1310 at a table 1320 and being surrounded by a plurality of SLPs 1330 illustrated as square blocks that are located away from but proximate to his face. The person 1300 holds a HPED 1340 in his left hand 1350 and points the HPED at one of the SLPs, shown as SLP 1360. Pointing the HPED at the SLP in effect selects this SLP for sound localization for a source he designates. Thereafter, sounds will localize to this selected SLP, such as sounds heard through a wearable electronic device 1370. The wearable electronic device also displays the SLPs 1330 to the person.

SLP 1360 is darkened when compared to the other SLPs 1330 to visually distinguish it from the other SLPs as being the one selected for sound localization. By way of example, SLP 1360 can be distinguished with shading, light, color, indicia, symbols, text, or other visually recognizable forms to signify its selection and to distinguish it from non-selected SLPs. Further, the SLPs 1330 are viewable on or through a display, such as a display of the HPED 1340, wearable electronic glasses, or another electronic device.

Consider an example of a phone call that originates from Bob to Alice, both of whom subscribe to a single channel monophonic mobile phone cellular network. They both have smartphones with stereo capability to play music, and they both have stereo earphones to listen to the music and to take telephone calls. Bob originates the call to Alice with the smartphone's stock phone application and waits while he hears the ring indicator. Alice is driving her car wearing headphones and is listening to her phone playing music when she hears a ringtone. The ringtone indicates the she does not have an SLP configured for her current location on the road. She also has not yet taken a call using a SLP with her new phone application that supports binaural speech convolution. She is already wearing her headphones with microphones so she takes this opportunity to create a SLP suitable to use in the car so she can enjoy a more natural phone conversation with the perception of Bob's voice externalized. On the display of her phone there is an "answer phone" button/option and a button/option that says, "answer at new SLP." Alice selects the latter option to answer at a new SLP. Her phone indicates that it will generate an SLP when the phone is steady at arm's length. Bob is then connected and they exchange greetings. Soon Alice tells Bob, "Hold on for a moment, I'm in a car and I'd like to externalize you . . . " She extends her right arm toward the passenger seat while keeping her face safely toward the road. The phone's binaural calling application monitors the image received by the phone's camera. When the application detects Alice's facial profile in the center of the image, the application uses the image to calculate the phone's location relative to the face of Alice and determines the distance to her face to be arm's length. The phone further uses its motion detector to determine that it is steady and provides an indication (e.g., vibratory or audio) to Alice that it is ready to create the SLP.

Alice's phone then emits a short tone repeatedly and captures the audio impulse responses with the microphones in Alice's ears as she faces the road. The application then creates a SLP and a new SLP record in memory and stores a timestamp, the new transfer function, the captured photo of Alice's profile, the GPS location at the time of the tone capture, and the position of the phone at the time of tone. The phone also recognizes the brand and model of Alice's headphones so it creates an additional common transfer function (CTF) and stores the CTF as well as the model of the headphones with the SLP record.

The sound from Bob's call is optimized for speech by his phone's hardware and signal processing that has removed noise and non-speech from the sound. Alice's application convolves the sound to localize at the SLP while the call conversation continues.

When Alice receives subsequent voice calls, her intelligent user agent (IUA) selects the transfer function that pre-calculates allowance for her headphones if she is wearing them at that time.

Bob is not using a phone application that can convolve Alice's monophonic voice, so he hears her voice internalized (i.e., inside his head). Later Alice uses the same phone to place a call to Bob from her home while she sits at her kitchen table and wears headphones. Her phone checks her GPS location and finds a SLP record that corresponds to Bob and her location at the kitchen table. A binaural phone application executing in her phone selects this SLP to convolve the call with Bob. When Alice places the call to Bob, she hears the ring localize to the SLP that is away from but proximate to her. This external localization notifies her that this location will be used as the SLP for Bob's voice when he answers. When Bob answers, Alice hears him speak from across the kitchen table at the SLP.

After their telephone conversation finishes, Bob downloads a call convolving application to his smartphone. Later, Alice calls Bob while he is at a café. Bob has not prepared a SLP and is unsure how to create one. During the phone call, he asks Alice to help him establish a SLP. Alice says, "I'm here at my kitchen table. Since you are at the café, I will send you my SLP. It might not fit great but it'll probably work." Alice tells Bob she will reveal her SLP location so he can see it. She allows permission for the other party, Bob, to see the relative positions of herself and where she has positioned the SLP of Bob. Bob can see an illustration on his phone of the relative positions of Alice and the SLP of his voice. He sees that Alice is about three feet away and a little to his right. Alice instructs him to select, "Enforce congruence" and he does.

In order to make the call congruent, Bob's IUA searches his SLP database for an SLP that can convolve Alice's voice to a zone about three feet away from him and a little to his right (which corresponds to Alice's position relative to him). Bob's SLP database, however, has no such SLP or available record, so his IUA requests a congruent SLP from Alice's call convolving application. In response to this request, Alice's call convolving application sends Bob's call convolving application the transfer function she is using (without her headphone CTF response modification). Bob's call convolving application uses the transfer function received from Alice, but swaps the left and right channels. This swapping happens in real-time when Bob selects "Enforce congruence" on his phone, and suddenly the voice of Alice moves from inside his to an external localization point a few feet in front of him slightly to the right. Bob talks to Alice with her voice localized across from him at the café table.

Later during their phone call, Alice moves to her bedroom and reclines on the bed with her face toward the ceiling. She still perceives his voice about three feet in front of her between her face and the ceiling rendered in an acoustic environment of her kitchen. Both of these audio attributes are irritating to Alice, so she issues a command to her phone to scan for an alternate SLP. An intelligent personal assistant (IPA) in her phone suggests several different SLPs from her database. Her IPA briefly convolves Bob's voice to each of the SLPs so Alice can hear the effects. Alice provides a verbal command to her IPA to select one of the alternate SLPs. The newly selected SLP suits her because as she lies on her back looking at the ceiling, she can hear Bob from beside her on the bed, facing her. This newly selected SLP also provides a cozy, attenuating, audio environment that gives her conversation with Bob a more intimate setting.

After the conversation Bob says goodnight and terminates the call. Alice hears a designated call termination sound that allows her to confirm that Bob is disconnected and not just pausing. The call termination sound begins at the SLP and transforms into a non-localized sound that is internalized by Alice, reminiscent of how monaural calls terminate from inside the head.

Consider an example of a Voice-over Internet Protocol (VoIP) call originating from Bob to Alice over a Transmission Control Protocol/Internet Protocol (TCP/IP) network. They both have smartphones with stereo capability to play music, and they both have stereo earphones to listen to music and to take telephone calls. Their earphones include binaural microphones. Bob originates the call to Alice with a Session Initiation Protocol (SIP) client that can transmit two full-duplex channels, sending the input from microphones at the earphones he is wearing, and receiving the left and right channels of the other party at his left and right ears. He initiates the VoIP call to Alice by selecting her phone number from the directory displayed in a SIP client application. This application initiates the call by first logging into a designated telephony switch that supports SIP connections and also makes available a stereo or binaural codec.

Bob is at his house holding a birthday party for Alice with some of her friends. Alice, however, cannot come to the party. Alice enjoys hearing the binaural sound captured at Bob's ears and streamed to her through the stereo codec without alteration. As he walks around the room talking with her friends, Alice can localize the different voices at the party. Bob is her audio avatar during the call.

While the party is going on, Alice is in a noisy hotel lobby and Bob is not interested in experiencing the localization of the sounds in her physical environment. Instead, Bob prefers to hear her speech without other noise so he can speak with her. So he gives a command to his smartphone that causes it to use a signal processing unit to dynamically separate her sound signals and to remove all sound except the sound of her speech. The smartphone also moves the sound of her speech to an SLP positioned directly to his left, with the angle of projection of her voice being directly forward, parallel to the direction of the projection of his own voice. Sound localization with this orientation gives Bob a familiar spatial configuration in which Alice accompanies him on his left, pacing him, and strolling with him around the room at the party.

To accomplish this localization, Bob first creates a SLP to his left by issuing to his smartphone the voice command, “Move voice.” This command triggers the smartphone to go into tone capture mode to generate a new SLP. He would like to place the SLP one meter away, which is longer than his arm, so he asks a friend to position his phone one meter to his left. A sound convolving application that executes in his smartphone creates a sound and proceeds to transform the impulse responses into a transfer function and generate a new SLP that corresponds to the location one meter to his left. A moment later the SLP is created and the sound convolving application determines that the single voice being received by the phone is the desired source to play at the new SLP. Suddenly, Bob hears Alice speaking at his side, facing the same direction that he faces. He walks through the party with his invisible friend, the guest of honor, Alice, whom only he can hear.

Figure 14:
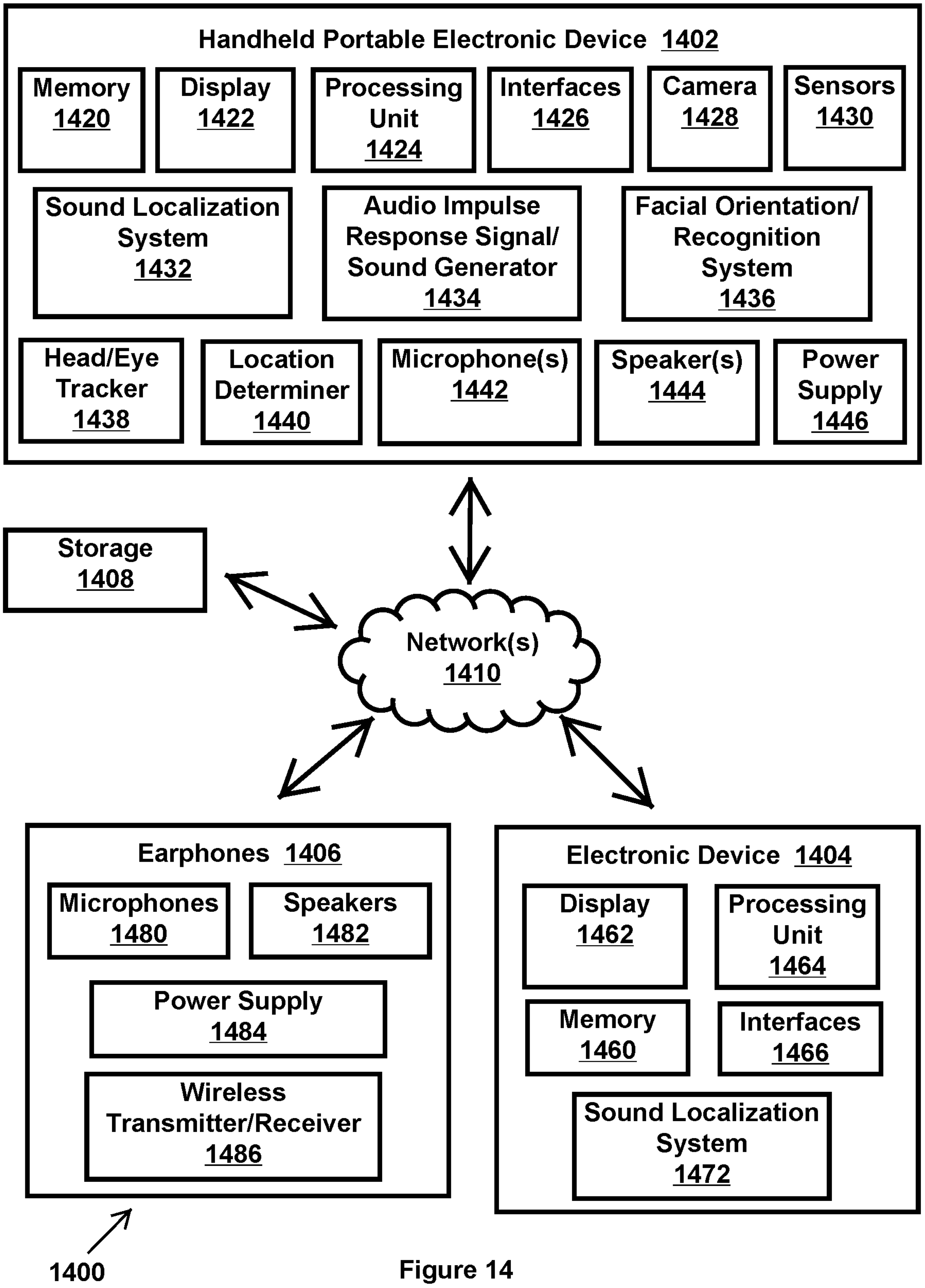
FIG. 14 is an electronic system in accordance with an example embodiment.

FIG. 14 is a computer system or electronic system 1400 that includes a handheld portable electronic device or HPED 1402, a computer or electronic device (such as a server) 1404, electronic earphones 1406, and storage or memory 1408 in communication with each other over one or more networks 1410.

The handheld portable electronic device 1402 includes one or more components of computer readable medium (CRM) or memory 1420, a display 1422, a processing unit 1424, one or more interfaces 1426 (such as a network interface, a graphical user interface, a natural language user interface, a natural user interface, a reality user interface, a kinetic user interface, touchless user interface, an augmented reality user interface, and/or an interface that combines reality and virtuality), a camera 1428, one or more sensors 1430 (such as micro-electro-mechanical systems sensor, a biometric sensor, an optical sensor, radio-frequency identification sensor, a global positioning satellite (GPS) sensor, a solid state compass, gyroscope, magnetometer, and/or an accelerometer), a sound localization system 1432 (such as a system that localizes sound, adjusts sound, predicts or extrapolates characteristics of sound, detects specific audio impulse responses, and/or executes one or more methods discussed herein), an audio impulse response signal or sound generator 1434, a facial orientation system and/or facial recognition system 1436, a head/eye tracker 1438, a location determiner 1440 (such as hardware and/or software discussed herein to determine or track location), microphones 1442, speakers 1444, and a battery or power supply 1446.

The storage 1408 can include memory or databases that store one or more of SLPs (including their locations and other information associated with a SLP including rich media such as sound files and images), user profiles and/or user preferences (such as user preferences for SLP locations and sound localization preferences), impulse responses and transfer functions (such as HRTFs, HRIRs, BRIRs, and RIRs), and other information discussed herein.

The network 1410 can include one or more of the Internet, a local area network (LAN), a wide area network (WAN), a metropolitan area network (MAN), a personal area network (PAN), home area network (HAM), and other public and/or private networks. Additionally, the electronic devices do not have to communicate with each other through a network. As one example, electronic devices can couple together via one or more wires, such as a direct wired-connection. As another example, electronic devices can communicate directly through a wireless protocol, such as Bluetooth, near field communication (NFC), or other wireless communication protocol. One device can trigger another device using sound waves.

The sensors 1430 can further include motion detectors (such as sensors that detect motion with one or more of infrared, optics, radio frequency energy, sound, vibration, and magnetism).

By way of example, a location determiner or location tracker includes, but is not limited to, a wireless electromagnetic motion tracker, a system using active markers or passive markers, a markerless motion capture system, video tracking (e.g. using a camera), a laser, an inertial motion capture system and/or inertial sensors, facial motion capture, a radio frequency system, an infrared motion capture system, an optical motion tracking system, an electronic tagging system, a GPS tracking system, an object recognition system (such as using edge detection), and other embodiments, such as hardware and/or software discussed in connection with block 360 and other example embodiments.

The sound localization system 1432 performs various tasks with regard to managing, generating, retrieving, storing, and selecting SLPs. These tasks include generating audio impulse responses or transfer functions for a person, convolving sound per the impulse responses or transfer functions, dividing an area around a head of a person into zones or areas, determining what SLPs are in a zone or area, mapping SLP locations and information for subsequent retrieval and display, selecting SLPs when a user is at a determined location, and executing one or more other blocks discussed herein. The sound localization system can also include a sound convolving application that convolves sound according to one or more audio impulse responses and/or transfer functions.

The audio impulse response signal generator or sound generator 1434 generates a sound, tone, or signal that produces the audio impulse response captured at the microphones (such as the microphones being worn by a person). By way of example, such sounds include, but are not limited to, a known spectrum stimulus sound, a frequency-swept sine wave, a click, a voice-like sound, a pulse, a maximum length sequence (MLS), a pseudo-random binary sequence, white or pink noise, a ping, a complementary Golay code, a voice announcing a word or a phrase, or another type of sound generated from a speaker to generate audio impulse responses. The sounds can be generated by the sound generator and can also be prepared sound files present on the HPED 1402 or received and updated from time to time through the network 1410.

The facial orientation system and/or facial recognition system 1436 recognizes faces of people, determines a facial orientation of a person, determines a distance from the HPED to a person, and performs other functions discussed herein with regard to facial orientation and facial recognition.

Electronic device 1404 includes one or more components of computer readable medium (CRM) or memory 1460, a display 1462, a processing unit 1464, one or more interfaces 1466, and a sound localization system 1472 (such as a system that performs one or more functions discussed herein).

The electronic earphones 1406 include one or more of microphones 1480 (such as left and right microphones that fit inside an ear of a person), speakers 1482 (such as a left and right speaker that are located in, at, or near an ear of a person), a battery or power supply 1484, and a wireless transmitter/receiver 1486. The wireless transmitter/receiver can support audio streams discussed herein (for example, 4 simultaneous streams, 2 channels out plus 2 channels in, at sample rates per by an example embodiment) as well as other data.

By way of example, a computer and an electronic device include, but are not limited to, handheld portable electronic devices (HPEDs), wearable electronic glasses, watches, wearable electronic devices, portable electronic devices, computing devices, electronic devices with cellular or mobile phone capabilities, digital cameras, desktop computers, servers, portable computers (such as tablet and notebook computers), electronic and computer game consoles, home entertainment systems, handheld audio playing devices (example, handheld devices for downloading and playing music and videos), personal digital assistants (PDAs), combinations of these devices, devices with a processor or processing unit and a memory, and other portable and non-portable electronic devices and systems.

The processor unit includes a processor (such as a central processing unit, CPU, microprocessor, application-specific integrated circuit (ASIC), etc.) for controlling the overall operation of memory (such as random access memory (RAM) for temporary data storage, read only memory (ROM) for permanent data storage, and firmware). The processing unit communicates with memory and performs operations and tasks that implement one or more blocks of the flow diagrams discussed herein. The memory, for example, stores applications, data, programs, algorithms (including software to implement or assist in implementing example embodiments) and other data.

Figure 15:
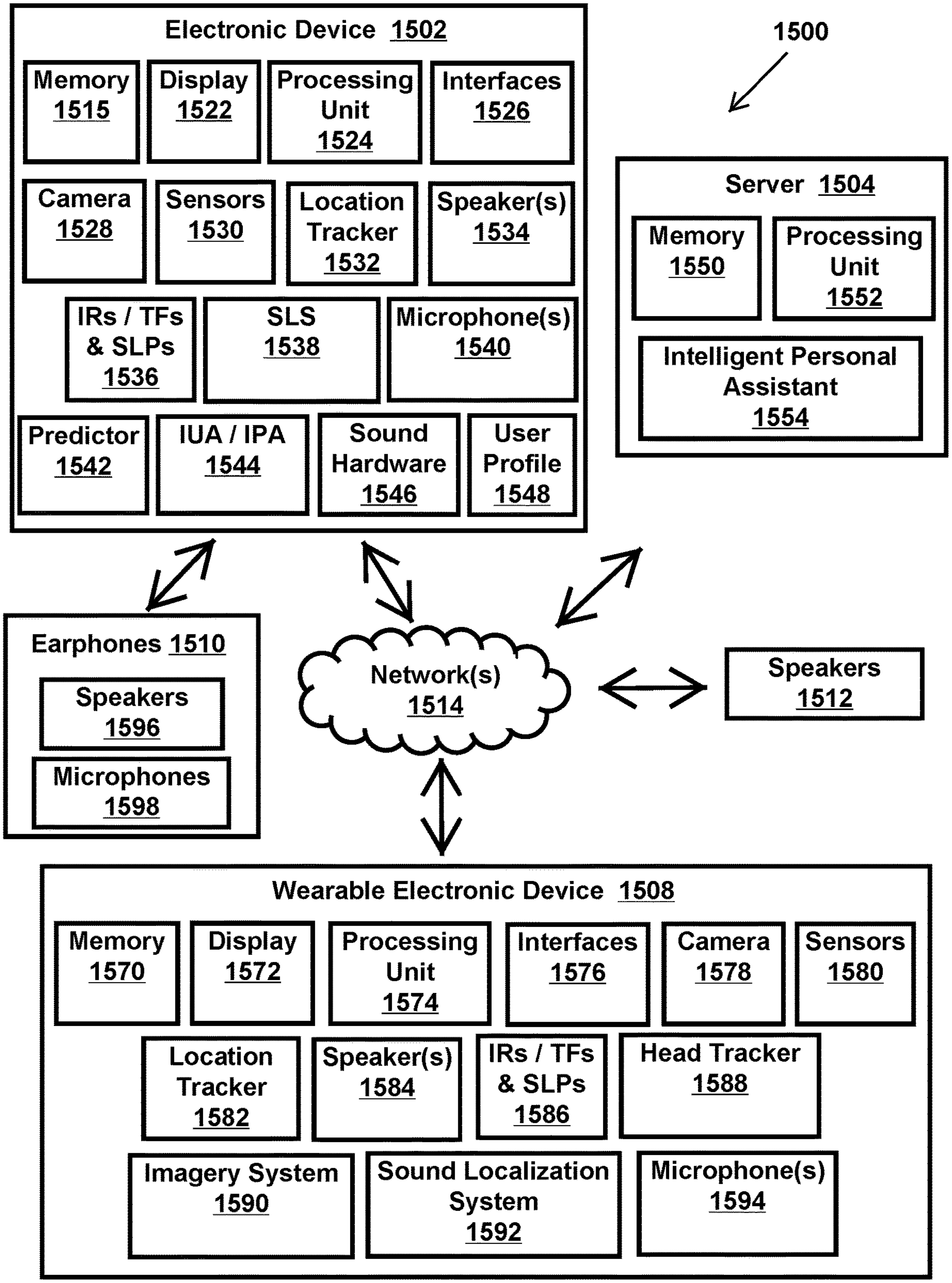
FIG. 15 is another electronic system in accordance with an example embodiment.

FIG. 15 is a computer system or electronic system 1500 that includes an electronic device 1502, a server 1504, a wearable electronic device 1508, earphones 1510, and speakers 1512 in communication with each other over one or more networks 1514.

By way of example, electronic devices include, but are not limited to, a computer, handheld portable electronic devices (HPEDs), wearable electronic glasses, watches, wearable electronic devices, portable electronic devices, computing devices, electronic devices with cellular or mobile phone capabilities, digital cameras, desktop computers, servers, portable computers (such as tablet and notebook computers), smartphones, electronic and computer game consoles, home entertainment systems, handheld audio playing devices (example, handheld devices for downloading and playing music and videos), appliances (including home appliances), personal digital assistants (PDAs), electronics and electronic systems in automobiles (including automobile control systems), combinations of these devices, devices with a processor or processing unit and a memory, and other portable and non-portable electronic devices and systems.

Electronic device 1502 includes one or more components of computer readable medium (CRM) or memory 1515, one or more displays 1522, a processor or processing unit 1524, one or more interfaces 1526 (such as a network interface, a graphical user interface, a natural language user interface, a natural user interface, a reality user interface, a kinetic user interface, touchless user interface, an augmented reality user interface, and/or an interface that combines reality and VR), a camera 1528, one or more sensors 1530 (such as micro-electro-mechanical systems sensor, an activity tracker, a pedometer, a piezoelectric sensor, a biometric sensor, an optical sensor, radio-frequency identification sensor, a global positioning satellite (GPS) sensor, a solid state compass, gyroscope, magnetometer, and/or an accelerometer), a location or motion tracker 1532, one or more speakers 1534, impulse responses, transfer functions, and/or SLPs 1536, a sound localization system 1538 (such as a system that executes one or more methods or blocks discussed herein), one or more microphones 1540, a predictor 1542, an intelligent user agent (IUA) and/or intelligent personal assistant (IPA) 1544, sound hardware 1546, and a user profile builder and/or user profile 1548.

Server 1504 includes computer readable medium (CRM) or memory 1550, a processor or processing unit 1552, and an intelligent personal assistant 1554.

By way of example, the intelligent personal assistant or intelligent user agent is a software agent that performs tasks or services for a person, such as organizing and maintaining information (emails, calendar events, files, to-do items, etc.), responding to queries, performing specific one-time tasks (such as responding to a voice instruction), performing ongoing tasks (such as schedule management and personal health management), and providing recommendations. By way of example, these tasks or services can be based on one or more of user input, prediction, activity awareness, location awareness, an ability to access information (including user profile information and online information), user profile information, and other data or information.

Wearable electronic device 1508 includes computer readable medium (CRM) or memory 1570, one or more displays 1572, a processor or processing unit 1574, one or more interfaces 1576 (such as an interface discussed herein), a camera 1578, one or more sensors 1580 (such as a sensor discussed herein), a motion or location tracker 1582, one or more speakers 1584, one or more impulse responses, transfer functions, and SLPs 1586, a head tracking system or head tracker 1588, an imagery system 1590, a sound localization system 1592, and one or more microphones 1594.

The earphones 1510 include a left and a right speaker 1596 and a left and a right microphone 1598.

By way of example, the sound hardware 1546 includes a sound card and/or a sound chip. A sound card includes one or more of a digital-to-analog (DAC) converter, an analog-to-digital (ATD) converter, a line-in connector for an input signal from a sound source, a line-out connector, a hardware audio accelerator providing hardware polyphony, and a digital-signal-processor (DSP). A sound chip is an integrated circuit (also known as a "chip") that produces sound through digital, analog, or mixed-mode electronics and includes electronic devices such as one or more of an oscillator, envelope controller, sampler, filter, and amplifier.

By way of example, the imagery system 1590 includes, but is not limited to, one or more of an optical projection system, a virtual image display system, virtual augmented reality system, lenses, and/or a spatial augmented reality system. By way of example, the virtual augmented reality system uses one or more of image registration, computer vision, and/or video tracking to supplement and/or change real objects and/or a view of the physical, real world.

In some instances, a HPED may not have an internal speaker capable of generating a sound sufficient to capture impulse responses at the microphones. The HPED can communicate with a separate sound impulse generator (such as a separate speaker 1512 proximate to the HPED) and cause this impulse generator to emit the sound to generate the impulse responses at the microphones. For example, the sound impulse generator 1512 can be a speaker coupled with or in communication with the HPED and mounted together with the HPED. The HPED can trigger the sound impulse generator to make the sound. An orientation allows the location and direction of transmission of the sound generated to be similar or the same for both the HPED speaker and the sound impulse generator 1512.

The event predictor or predictor 1542 predicts or estimates events including, but not limited to, switching or changing between binaural and stereo sounds at a future time, changing or altering binaural sound (such as moving a SLP, reducing a number of SLPs, eliminating a SLP, adding a SLP, starting transmission or emission of binaural sound, stopping transmission or emission of binaural sound, etc.), predicting an action of a user, predicting a location of a user, predicting an event, predicting a desire or want of a user, predicting a query of user (such as a query to an intelligent personal assistant), etc. The predictor can also predict user actions or requests in the future (such as a likelihood that the user or electronic device requests a switch between binaural and stereo sounds or a change to binaural sound). For instance, determinations by a software application, an electronic device, and/or the user agent can be modeled as a prediction that the user will take an action and/or desire or benefit from a switch between binaural and stereo sounds or a change to binaural sound (such as pausing binaural sound, muting binaural sound, reducing or eliminating one or more cues or spatializations or localizations of binaural sound). For example, an analysis of historic events, personal information, geographic location, and/or the user profile provides a probability and/or likelihood that the user will take an action (such as whether the user prefers binaural sound or stereo sound for a particular location, a particular listening experience, or a particular communication with another person or an intelligent personal assistant). By way of example, one or more predictive models are used to predict the probability that a user would take, determine, or desire the action.

The predictive models can use one or more classifiers to determine these probabilities. Example models and/or classifiers include, but are not limited to, a Naive Bayes classifier (including classifiers that apply Bayes' theorem), k-nearest neighbor algorithm (k-NN, including classifying objects based on a closeness to training examples in feature space), statistics (including the collection, organization, and analysis of data), collaborative filtering, support vector machine (SVM, including supervised learning models that analyze data and recognize patterns in data), data mining (including discovery of patterns in data-sets), artificial intelligence (including systems that use intelligent agents to perceive environments and take action based on the perceptions), machine learning (including systems that learn from data), pattern recognition (including classification, regression, sequence labeling, speech tagging, and parsing), knowledge discovery (including the creation and analysis of data from databases and unstructured data sources), logistic regression (including generation of predictions using continuous and/or discrete variables), group method of data handling (GMDH, including inductive algorithms that model multi-parameter data) and uplift modeling (including analyzing and modeling changes in probability due to an action).

Consider an example in which the predictor tracks and stores event data over a period of time, such as days, weeks, months, or years for users of binaural sound. This event data includes recording and analyzing patterns of actions with the binaural sound and motions of an electronic device (such as an HPED or electronic earphones). Based on this historic information, the predictor predicts what action a particular user will take with an electronic device (e.g., whether the user will accept or place a voice call in binaural sound or stereo sound and with whom and at what time and locations, whether the user will communicate with an intelligent personal assistant in binaural sound or stereo sound at what times and locations and for what durations, whether the user will listen to music in binaural sound or stereo sound and from which sources, where the user will take the electronic device, in what orientation it will be carried, the travel time to the destination and the route to get there, in what direction a user will walk or turn or orient his/her head or gaze, what mood or emotion a user is experiencing, etc.).

One or more electronic devices can also monitor and collect data with respect to the person and/or electronic devices, such as electronic devices that the person interacts with and/or owns. By way of example, this data includes user behavior on an electronic device, installed client hardware, installed client software, locally stored client files, information obtained or generated from the user's interaction with a network (such as web pages on the internet), email, peripheral devices, servers, other electronic devices, programs that are executing, SLP locations, SLP preferences, binaural sound preferences, music listening preferences, time of day and period of use, sensor readings (such as common gaze angles and patterns of gaze at certain locations such as a work desk or home armchair, common device orientations and cyclical patterns of orientation such as one gathered while a device is in a pocket or on a head), etc. The electronic devices collect user behavior on or with respect to an electronic device (such as the user's computer), information about the user, information about the user's computer, and/or information about the computer's and/or user's interaction with the network.

By way of example, a user agent (including an IUA) and/or user profile builder monitors user activities and collects information used to create a user profile, and this user profile includes public and private information. The profile builder monitors the user's interactions with one or more electronic devices, the user's interactions with other software applications executing on electronic devices, activities performed by the user on external or peripheral electronic devices, etc. The profile builder collects both content information and context information for the monitored user activities and then stores this information. By way of further illustration, the content information includes contents of web pages and internet links accessed by the user, people called, subjects spoken of, locations called, questions or tasks asked of an IPA, graphical information, audio/video information, patterns in head tracking, device orientation, location, physical and virtual positions of conversations, searches or queries performed by the user, items purchased, likes/dislikes of the user, advertisements viewed or clicked, information on commercial or financial transactions, videos watched, music played, interactions between the user and a user interface (UI) of an electronic device, commands (such as voice and typed commands), information relating to SLPs and binaural sound, etc.

The user profile builder also gathers and stores information related to the context in which the user performed activities associated with an electronic device. By way of example, such context information includes, but is not limited to, an order, frequency, duration, and time of day in which the user accessed web pages, audio streams, SLPs, information regarding the user's response to interactive advertisements, calls, requests and notifications from intelligent personal assistants (IPAs), information as to when or where a user localized binaural sounds, switched to or from binaural sound sending or receiving, etc.

As previously stated, the user profile builder also collects content and context information associated with the user interactions with various different applications executing on one or more electronic devices. For example, the user profile builder monitors and gathers data on the user's interactions with a telephony application, an AAR application, web browser, an electronic mail (email) application, a word processor application, a spreadsheet application, a database application, a cloud software application, a sound localization system (SLS), and/or any other software application executing on an electronic device.

Consider an example in which a user agent and/or electronic device gathers SLP preferences while the user communicates during a voice exchange with an intelligent user agent, an intelligent personal assistant, or another person during a communication over the Internet. For example, a facial and emotional recognition system determines facial and body gestures of a user while the user communicates during the voice exchange. For instance, this system can utilize Principal Component Analysis with Eigenfaces, Linear Discriminate Analysis, 3D facial imaging techniques, emotion classification algorithms, Bayesian Reasoning, Support Vector Machines, K-Nearest Neighbor, neural networks, or a Hidden Markov Model. A machine learning classifier can be used to recognize an emotion of the user.

By way of example, SLP preferences can include a person's personal likes and dislikes, opinions, traits, recommendations, priorities, tastes, subjective information, etc. with regard to SLPs and binaural sound. For instance, the preferences include a desired or preferred location for a SLP during a voice exchange, a desired or preferred time when to localize sound versus not localize sound, permissions that grant or deny people rights to localize to a SLP that is away from but proximate to a person during a voice exchange (such as a VoIP call), a size and/or shape of a SLP, a length of time that sound localizes to a SLP, a priority of a SLP, a number of SLPs that simultaneously localize to a person, etc. Consider an example in which a HPED has a mobile operating system that includes a computer program that is an intelligent personal assistant (IPA) and knowledge navigator. The IPA uses a natural language user interface to interact with a user, answer questions, perform services, make recommendations, and communicates with a database and web services to assist the user. The IPA further includes or communicates with a predictor and/or user profiler to provide its user with individualized searches and functions specific to and based on preferences of the user. A conversational interface (e.g., using a natural language interface with voice recognition), personal context awareness (e.g., using user profile data to adapt to individual preferences with personalized results), and service delegation (e.g., providing access to built-in applications in the HPED) enable the IPA to interact with its user and perform functions discussed herein. For example, the IPA predicts and/or intelligently performs generating and capturing the sound from a HPED to acquire the impulse responses and/or transfer functions or and executing other methods discussed herein.

Consider an example in which a HPED has a mobile operating system with a computer program that is an intelligent personal assistant (IPA) and knowledge navigator. The IPA uses a natural language user interface to interact with a user, answer questions, perform services, make recommendations, and communicate with a database and web services to assist the user. The IPA further includes or communicates with a predictor and/or user profile to provide its user with individualized searches and functions specific to and based on preferences of the user, such as selecting a SLP at a location. A conversational interface (e.g., using a natural language interface with voice recognition and machine learning), personal context awareness (e.g., using user profile data to adapt to individual preferences and provide personalized results), and service delegation (e.g., providing access to built-in applications in the HPED) enable the IPA to interact with its user and perform functions discussed herein (such as one or more blocks in the figures). For example, the IPA predicts and/or intelligently performs generating a tone for an impulse response, convolving sounds with specific impulse response or transfer functions, selecting between multiple SLPs at a location, and executing other methods discussed herein.

FIGS. 14 and 15 show example electronic devices with various components. One or more of these components can be distributed or included in various electronic devices, such as some components being included in an HPED, some components being included in a server, some components being included in storage accessible over the Internet, some components being in an imagery system, some components being in wearable electronic devices, and some components being in various different electronic devices that are spread across a network or a cloud, etc.

Figure 16:
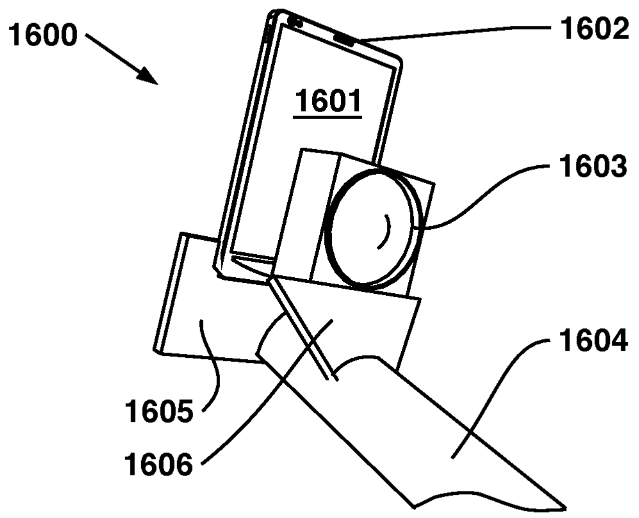
FIG. 16 shows an electronic system that includes a HPED and a separate speaker attached to a pole in accordance with an example embodiment.

The speaker that generates the sound to capture the impulses responses can be physically separate from the HPED. By way of example, FIG. 16 shows an electronic system 1600 in which a HPED 1601 and an impulse generator or speaker 1603 connect to an end of a pole, rod, selfie-stick, or monopod 1604. The HPED 1601 and the speaker 1603 are connected to or positioned between a back brace 1605 and a front brace 1606 such that the HPED and speaker are next to each other and pointing in a same or similar direction for generation and capture of audio impulse responses as discussed herein.

Example embodiments are not limited to using a HPED to generate a sound from its speaker to capture audio impulse responses since the HPED can execute one or more blocks discussed herein to manage HRTFs in other ways. For example, the HPED executes one or more blocks discussed herein and designates a location for a SLP, and retrieves HRTFs or HRIRs for the location of this SLP. For example, Alice holds the HPED in her hand away from her face and provides a command to the HPED to capture a SLP (e.g., Alice issues a voice command or taps on the display). In response to this command, the HPED determines its location with respect to the face or facial orientation of Alice and generates a SLP for this location (such as determining distance, azimuth angle and/or elevation angle). The HPED then retrieves an individualized HRTF for Alice from memory (such as an online database) and convolves sound with this HRTF so the sound localizes to the SLP that coincides with where the HPED was when Alice provided the command to the HPED. The HPED can select a set of HRTFs for this location of the SLP or another location near this SLP. For example, Alice holds the HPED at a location for a near-field HRTF, but the HPED retrieves a far-field HRTF corresponding to the azimuth and elevation angles of where the SLP was generated.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

As used herein, "impulse response" is a reaction to an audio input signal in response to external change. Impulse responses include recordings of reverberation caused by an acoustic space (such as a room, human head and/or body, dummy head, etc.) when an impulse is played. The impulse response can be from physical objects or mathematical systems of equations describing or estimating the objects.

Further, the impulse can be modeled in either discrete time or continuous time. Furthermore, systems can use transfer functions or impulse response for analysis (the transfer function being a Laplace Transform of the impulse response). Examples of impulse responses include RIRs, HRIRs, and BRIRs.

As used herein, "line-of-sight" is the forward-looking direction of the face of the person that extends along a straight line from an end of the nose of the person.

As used herein, a "user" can be a human being, an intelligent personal assistant (IPA), a user agent (including an intelligent user agent and a machine learning agent), a process, a computer system, a server, a software program, hardware, an avatar, or an electronic device. A user can also have a name, such as Alice, Bob, and Charlie, as described in some example embodiments.

As used herein, a "user agent" is software that acts on behalf of a user. User agents include, but are not limited to, one or more of intelligent user agents and/or intelligent electronic personal assistants (IPAs, software agents, and/or assistants that use learning, reasoning and/or artificial intelligence), multi-agent systems (plural agents that communicate with each other), mobile agents (agents that move execution to different processors), autonomous agents (agents that modify processes to achieve an objective), and distributed agents (agents that execute on physically distinct electronic devices).

As used herein, a "user profile" is personal data that represents an identity of a specific person or organization. The user profile includes information pertaining to the characteristics and/or preferences of the user. Examples of this information for a person include, but are not limited to, one or more of personal data of the user (such as age, gender, race, ethnicity, religion, hobbies, interests, income, employment, education, location, communication hardware and software used including peripheral devices such as head tracking systems, abilities, disabilities, biometric data, physical measurements of their body and environments, functions of physical data such as HRTFs, etc.), photographs (such as photos of the user, family, friends, and/or colleagues, their head and ears), videos (such as videos of the user, family, friends, and/or colleagues), and user-specific data that defines the user's interaction with and/or content on an electronic device (such as display settings, audio settings, application settings, network settings, stored files, downloads/uploads, browser and calling activity, software applications, user interface or GUI activities, and/or privileges).

Examples herein can take place in physical spaces, in computer rendered spaces (VR), in partially computer rendered spaces (AR), and in combinations thereof.

The processor unit includes a processor (such as a central processing unit, CPU, microprocessor, field programmable gate array (FPGA), application-specific integrated circuit (ASIC), etc.) for controlling the overall operation of memory (such as random access memory (RAM) for temporary data storage, read only memory (ROM) for permanent data storage, and firmware). The processing unit communicates with memory and performs operations and tasks that implement one or more blocks of the flow diagrams discussed herein. The memory, for example, stores applications, data, programs, algorithms (including software to implement or assist in implementing example embodiments) and other data.

Consider an example in which the SLS or portions of the SLS include an integrated circuit FPGA that is specifically customized, designed, configured, or wired to execute one or more blocks discussed herein. For example, the FPGA includes one or more programmable logic blocks that are wired together or configured to execute combinational functions for the SLS.

Consider an example in which the SLS or portions of the SLS include an integrated circuit or ASIC that is specifically customized, designed, or configured to execute one or more blocks discussed herein. For example, the ASIC has customized gate arrangements for the SLS. The ASIC can also include microprocessors and memory blocks (such as being a SoC (system-on-chip) designed with special functionality to execute functions of the SLS).

Consider an example in which the SLS or portions of the SLS include one or more integrated circuits that are specifically customized, designed, or configured to execute one or more blocks discussed herein.

In some example embodiments, the methods illustrated herein and data and instructions associated therewith are stored in respective storage devices, which are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

Method blocks discussed herein can be automated and executed by a computer, computer system, user agent, and/or electronic device. The term "automated" means controlled operation of an apparatus, system, and/or process using computers and/or mechanical/electrical devices without the necessity of human intervention, observation, effort, and/or decision.

The methods in accordance with example embodiments are provided as examples, and examples from one method should not be construed to limit examples from another method. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

What is claimed is:

1. A method comprising:

determining, with a portable electronic device of a person entering a location, whether a room impulse response (RIR) for the location is stored in memory;

retrieving, from the memory, the RIR for the location in response to determining the RIR for the location is stored in the memory;

capturing, with the portable electronic device, the RIR for the location in response to determining the RIR for the location is not stored in the memory;

processing, with one or more processors, sound with the RIR for the location to generate binaural sound; and playing, with the portable electronic device and to the person, the binaural sound that externally localizes at a sound localization point (SLP) in empty space in response to determining the person is at the location.

2. The method of claim 1 further comprising:

determining, with the portable electronic device, the person moved from the location to a second location having a second RIR; and changing processing of the sound with the RIR to processing of the sound with the second RIR in response to the determining the person moved from the location to the second location.

3. The method of claim 1 further comprising:

playing, with the portable electronic device with the person, a sound to capture the RIR for the location in response to the determining the RIR for the location is not stored in the memory.

4. The method of claim 1 further comprising:

designating the SLP in empty space at a location where the portable electronic device is pointed.

5. The method of claim 1 further comprising:

generating, with the portable electronic device, the RIR for the location from a three-dimensional (3D) map of the location in response to the determining the RIR for the location is not stored in the memory.

6. The method of claim 1 further comprising:

displaying, on a display of the portable electronic device, a virtual map that shows locations of different RIRs for different locations.

7. The method of claim 1 further comprising:

mapping the RIR into a three-dimensional (3D) virtual map; and displaying, with the portable electronic device that is worn on a head of the person, the 3D virtual map that includes the RIR.

8. A method comprising:

determining whether a room impulse response (RIR) exists for a location where a person wearing a wearable electronic device (WED) is located;

generating, with the WED worn on a head of the person, the RIR for the location in response to determining the RIR does not exist for the location;

processing, with one or more processors, sound with the RIR for the location to generate binaural sound; and automatically playing, with the WED worn on the head of the person, the binaural sound that externally localizes at a sound localization point (SLP) in empty space in response to determining the person is at the location.

9. The method of claim 8 further comprising:

determining, with the WED, the person moved from the location to a second location having a different RIR; and changing processing of the sound with the RIR to processing of the sound with the second RIR in response to the determining the person moved from the location to the second location.

10. The method of claim 8 further comprising:

generating, from a three-dimensional map of the location, the RIR for the location in response to determining the RIR does not exist for the location.

11. The method of claim 8 further comprising:

displaying, with a display of the WED worn on the head of the person, a virtual map that shows locations of different RIRs in a spherical shape.

12. The method of claim 8 further comprising:

mapping the RIR into a three-dimensional (3D) map of the location; and displaying, with the WED, a virtual image of the 3D map that shows the RIR for the location.

13. The method of claim 8 further comprising:

displaying, with a display of the WED, a plurality of SLPs in empty space that extend around the head of the person as a partial sphere.

14. The method of claim 8 further comprising:

generating the RIR with sound played from a portable electronic device in a hand of the person.

15. An electronic device, comprising:

a display that displays, when a person is at a location, a virtual image at a sound localization point (SLP) in empty space;

a memory; and one or more processors that execute instructions that cause the electronic device to retrieve a room impulse response (RIR) for the location from the memory in response to determining the RIR for the location is stored in the memory, generate the RIR for the location in response to determining the RIR for the location is not stored in the memory, and process sound with the RIR for the location in order to generate binaural sound that externally localizes at the SLP in empty space in response to the person being at the location.

16. The electronic device of claim 15, wherein the display displays a three-dimensional virtual reality (VR) map of the location that shows the RIR.

17. The electronic device of claim 16, wherein the display displays a plurality of virtual SLPs in a spherical shape around a head of the person.

18. The electronic device of claim 16 further comprising:

one or more sensors that designates a location of the SLP by pointing to the location of the SLP.

19. The electronic device of claim 16, wherein the electronic device designates a location of the SLP as a location where the electronic device is while held in a hand of the person.

20. The electronic device of claim 16, wherein display displays a plurality of SLPs in empty space as virtual images that form a partial sphere around a head of the person.

* * * * *